(12) United States Patent
Bertrand et al.

(10) Patent No.: US 8,379,507 B2
(45) Date of Patent: *Feb. 19, 2013

(54) ALLOCATION AND LOGICAL TO PHYSICAL MAPPING OF SCHEDULING REQUEST INDICATOR CHANNEL IN WIRELESS NETWORKS

(75) Inventors: Pierre Bertrand, Antibes (FR); Zukang Shen, Richardson, TX (US); Tarik Muharemovic, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,994

(22) Filed: Sep. 27, 2011

(65) Prior Publication Data
US 2012/0014243 A1 Jan. 19, 2012

Related U.S. Application Data

(63) Continuation of application No. 12/344,156, filed on Dec. 24, 2008, now Pat. No. 8,059,524.

(51) Int. Cl.
*H04J 11/00* (2006.01)

(52) U.S. Cl. ........ 370/203; 370/310; 370/328; 375/259; 375/260; 455/403; 455/422.1; 455/450; 455/452.1

(58) Field of Classification Search .......... 370/203–211, 370/310–350; 375/259–260; 455/403, 422.1, 455/452, 452.1

See application file for complete search history.

(56) References Cited

U.S. PATENT DOCUMENTS
8,059,524 B2 * 11/2011 Bertrand et al. ............. 370/203

* cited by examiner

*Primary Examiner* — Charles C Jiang
(74) *Attorney, Agent, or Firm* — John R. Pessetto; W. James Brady; Frederick J. Telecky, Jr.

(57) ABSTRACT

A method for allocating resources for a scheduling request indicator (SRI) is disclosed. An SRI cycle period for use by user equipment (UE) within a cell is transmitted from a NodeB in a cell to UE within the cell. The NodeB transmits a specific SRI subframe offset and an index value to the particular UE within the cell. The specific SRI subframe offset and the index value enable the UE to determine a unique combination of cyclic shift, RS orthogonal cover, data orthogonal cover, and resource block number for the UE to use as a unique physical resource for an SRI in the physical uplink control channel (PUCCH).

14 Claims, 8 Drawing Sheets

ALLOCATION AND LOGICAL TO PHYSICAL MAPPING OF SCHEDULING REQUEST INDICATOR CHANNEL IN WIRELESS NETWORKS

The present application discloses and claims only subject matter disclosed in prior non-provisional application Ser. No. 12/344,156, now U.S. Pat. No. 8,059,524, and names inventors named in the prior non-provisional application. Accordingly, this application may constitute a continuation or division.

FIELD OF THE INVENTION

This invention generally relates to wireless cellular communication, and in particular to transmission of scheduling request indicator signals in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access Network (E-UTRAN), are being standardized by the 3GPP working groups (WG). OFDMA and SC-FDMA (single carrier FDMA) access schemes were chosen for the down-link (DL) and up-link (UL) of E-UTRAN, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station (also referred to as NodeB) responds with allocated UL resource and timing advance information to allow the UE to transmit on the PUSCH. The 3GPP RAN Working Group 1 (WG1) has agreed on a preamble based physical structure for the PRACH. RAN WG1 also agreed on the number of available preambles that can be used concurrently to minimize the collision probability between UEs accessing the PRACH in a contention-based manner. These preambles are multiplexed in CDM (code division multiplexing) and the sequences used are Constant Amplitude Zero Auto-Correlation (CAZAC) sequences. All preambles are generated by cyclic shifts of a number of root sequences, which are configurable on a cell-basis.

In the case where the UE is UL synchronized, it uses a contention-free Scheduling Request (SR) channel for the transmission of a scheduling request. As opposed to the former case, the latter case is a contention-free access. In other words, a particular scheduling request channel in a particular transmission instance is allocated to at most one UE. In 3GPP LTE, a two-state scheduling request indicator can be transmitted on a SR channel. In case a UE has a pending SR to transmit, it transmits a positive (or ON) SRI on its next available SR channel. In case a UE does not have a pending SR to transmit, it transmits a negative (or OFF) SRI, or equivalently transmits nothing on its assigned SR channel. Such a "non-transmission" is also referred to as DTX transmission. A pending (i.e. positive or ON) SRI is triggered by, including but are not limited to, buffer status changes or event-triggered measurement reports. WG1 has agreed that a two-state Scheduling Request Indicator (SRI) be transmitted with On-Off Keying using a structure similar to ACK/NACK transmission.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one-bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. As seen from this example, some elements of the control information should be provided additional protection, when compared with other information. For instance, the ACK/NACK information is typically required to be highly reliable in order to support an appropriate and accurate HARQ operation. This uplink control information is typically transmitted using a physical uplink control channel (PUCCH). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. The Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, re-transmissions are possible, and PUSCH is expected to be generally scheduled with less stand-alone sub-frame reliability than PUCCH. The general operations of the physical channels are described in the EUTRA specifications, for example: "3$^{rd}$ Generation Partnership Project; Technical Specification Group Radio Access Network; Evolved Universal Terrestrial Radio Access (E-UTRA); Physical Channels and Modulation (Release 8)."

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

The SRI (schedule request indicator) is configured semi-statically by the eNB, and occurs periodically. The typical period for the SRI is 10 ms so as to provide a low-latency procedure whenever the UE needs to transmit new data. A simple method for provisioning and allocating SRI resources on PUCCH is described herein, summarized as follows. First, a one-to-one mapping of logical SRI index to physical resources is defined for all PUCCH RBs. Then, the eNB signals the start and period of the SRI cycle, and allocates an SRI resource index to a UE through L3 signaling.

Figure 1:
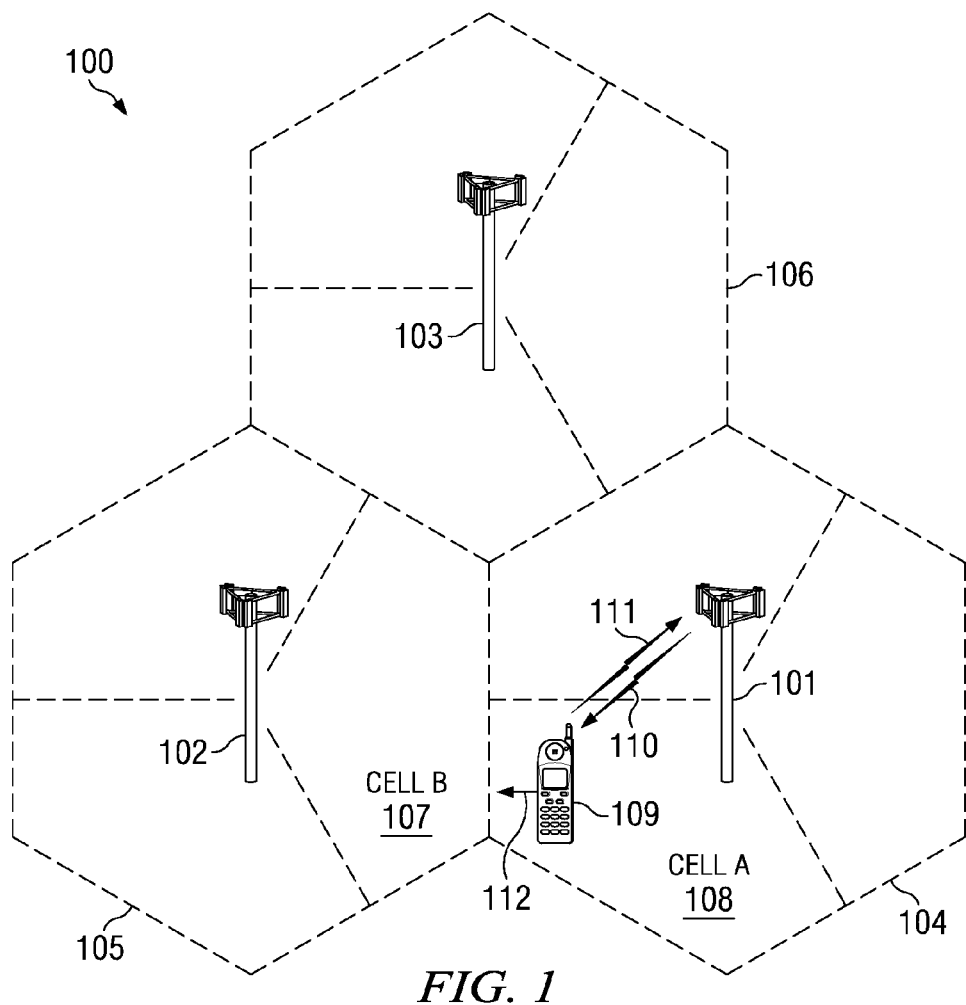
FIG. 1 is a pictorial of an illustrative telecommunications network where SRI resources are allocated for transmission in uplink according to an embodiment of the present invention.

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station (eNB) 101. Base station 101 is transmitting to and receiving transmissions from UE 109 via downlink 110 and uplink 111. A UE in a cell may be stationary such as within a home or office, or may be moving while a user is walking or riding in a vehicle. UE 109 moves within cell 108 with a velocity 112 relative to base station 101. As UE 109 moves out of Cell A 108, and into Cell B 107, UE 109 may be handed over to base station 102. Because UE 109 is synchronized with base station 101, UE 109 must employ non-synchronized random access to initiate handover to base station 102. As long as UE remains within cell 108 and remains synchronized to eNB 101 it may request allocation of resources using the scheduling request procedure. The particular resource used by UE 109 to transmit SRI is allocated to it by eNB 101, using a allocation procedure that will be described in more detail below. As UE 109 moves from coverage area 104 to coverage area 105 that is controlled by eNB 102 it will receive a new SRI allocation from eNB 102 using the allocation procedure after it becomes synchronized with eNB 102.

Figure 2:
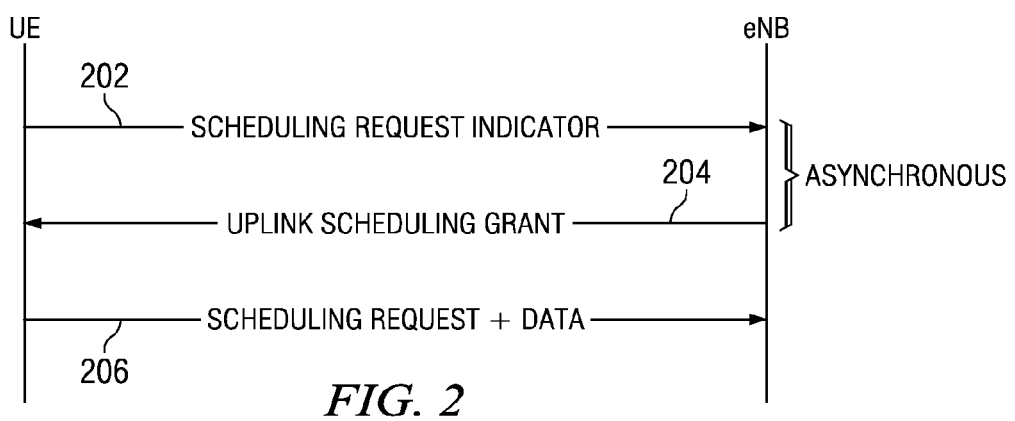
FIG. 2 is a ladder diagram illustrating a Scheduling Request procedure for UL synchronized UEs using an allocated SRI resource in the network of FIG. 1.

FIG. 2 is a ladder diagram illustrating a scheduling request procedure for UL synchronized UEs. For example, a UE, such as UE 109 in FIG. 1, is semi-statically allocated an SRI channel on a set of periodic transmission instances using the allocation procedure that will be described in more detail below. When UE 109 determines that it needs to transmit data or information to eNB 101 (i.e. the UE has a pending scheduling request), it first transmits a positive (or ON) SRI 202 at its next assigned SRI transmission opportunity. Here, an SRI transmission opportunity refers to an allocated SRI channel on a transmission instance. The eNB receives SRI 202 and then issues an uplink scheduling grant 204 to UE 108. UE 108 then transmits a scheduling request (SR) 206 along with data defining what resources are required using the just-allocated resource indicated in scheduling grant 204.

Figure 3:
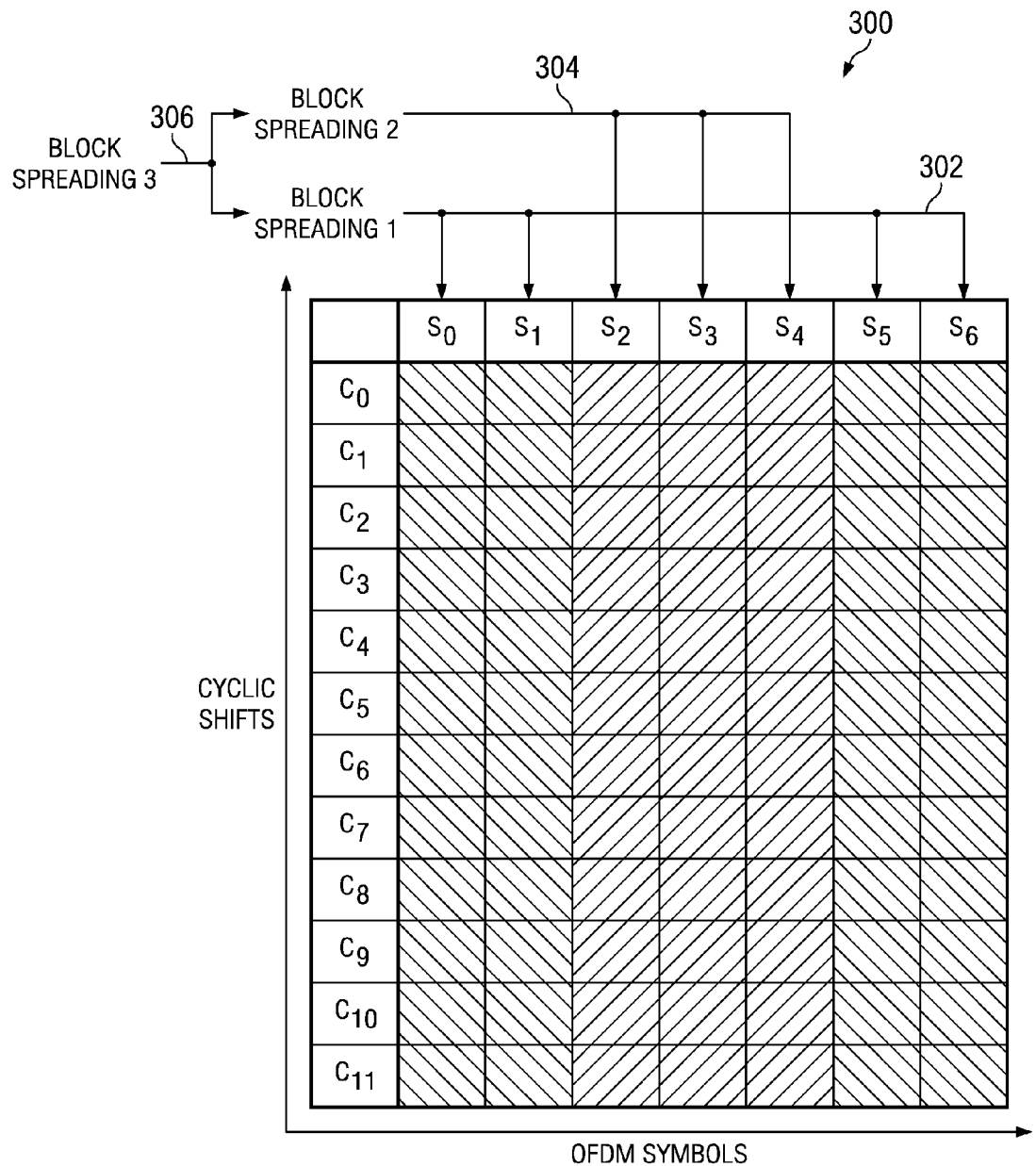
FIGS. 3 and 4 illustrate SRI transmission structures per slot on PUCCH for short and long CP, respectively, for use in the network of FIG. 1.
Figure 4:
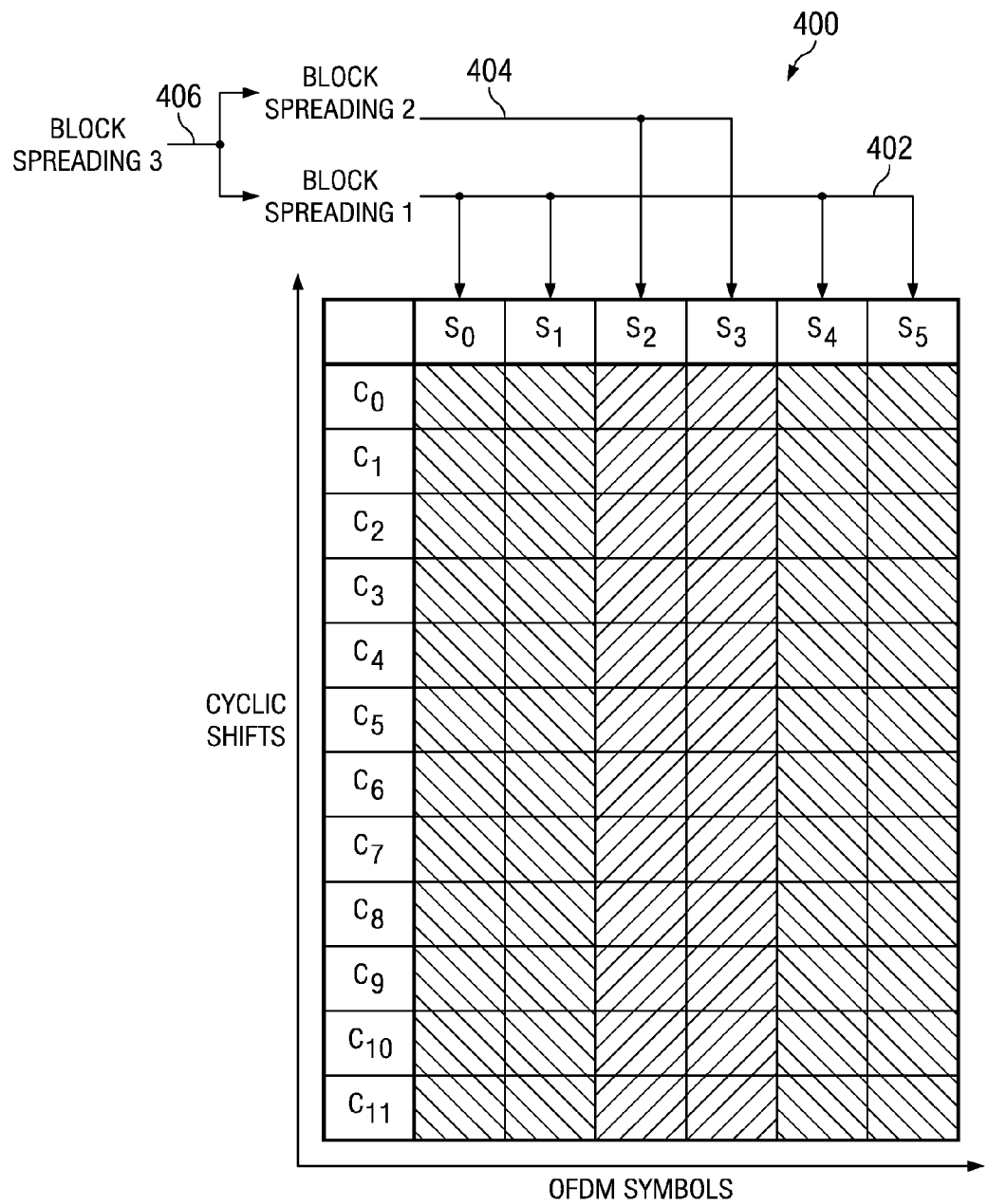

FIGS. 3 and 4 illustrate coherent orthogonal structures 300 and 400, respectively, which support transmission of SRI by multiple users within the same frequency and time resource. A similar structure is specified in E-UTRA specifications for ACK/NACK transmission on PUCCH. FIG. 3 illustrates one slot 300 of a transmission frame in which normal cyclic prefix (CP) are used, where $C_0$-$C_{11}$ represent the cyclic shifts of a root CAZAC-like sequence, and $S_0$-$S_6$ represent seven OFDM symbols per slot (0.5 ms). Without loss of generality, the middle three OFDM symbols $S_2$-$S_4$ carry PUCCH DM RS, while the other four OFDM symbols carry SRI data information. Orthogonal covering 302 and 304 is applied to the data bearing OFDM symbols and the RS OFDM symbols, respectively. A third length-2 orthogonal covering sequence 306 is applied on to the length-3 and length-4 orthogonal covering sequences. In case a UE has a pending scheduling request and is transmitting a positive (or ON) SRI, then the CAZAC-like sequences in OFDM symbols $S_0$, $S_1$, $S_5$, $S_6$ are modulated/multiplied by 1. In case a UE does not have a pending scheduling requesting, it does not transmit any signal on its assigned SRI channel, including the RS symbols and the data symbols, which is equivalent to transmitting a negative (or OFF) SRI.

Similarly, FIG. 4 illustrates one slot 400 of a transmission frame in which extended cyclic prefix (CP) are used and therefore only six symbols $S_0$-$S_5$ are available per slot (0.5 ms). The middle two OFDM symbols $S_2$-$S_3$ carry PUCCH DM RS, while the other four OFDM symbols carry SRI data information. Orthogonal covering 402 and 404 is applied to the data bearing OFDM symbols and the RS OFDM symbols, respectively. A third length-2 orthogonal covering sequence 406 is applied on to the length-2 orthogonal covering sequence 404 and length-4 orthogonal covering sequence 402. In case a UE has a pending scheduling request and is transmitting a positive (or ON) SRI, then the CAZAC-like sequences in OFDM symbols $S_0$, $S_1$, $S_4$, $S_5$ are modulated/multiplied by 1. In case a UE does not have a pending scheduling requesting, it does not transmit any signal on its assigned SRI channel, including the RS symbols and the data symbols, which is equivalent to transmit a negative (or OFF) SRI.

For the SRI structure illustrated in FIG. 3, in each slot of a two slot sub-frame, a seven symbol length sequence is split into two orthogonal sequences, length three and length four, as illustrated. In 3GPP LTE, the defined length-3 orthogonal covering sequence 304 is a DFT sequence, while the length-4 orthogonal covering sequence 302 is a Hadamard sequence. A third length-2 orthogonal covering sequence 306 can be applied on to the length-3 and length-4 orthogonal covering sequences, which allows multiplexing up to six UEs per cyclic shift. Using up to six cyclic shifts out of twelve available per 180 kHz frequency resource block (RB) this SRI channel can multiplex 36 UEs per RB and per sub-frame (1 ms). Given a desired SRI period of 10 ms per UE, and assuming SRI channels are continuously allocated along one RB, the SR capacity is 360 UEs per RB, which is in-line with the estimated number of UL synchronized UEs in 5 MHz. A similar reasoning yields 240 UEs per RB with the long CP structure, as illustrated in FIG. 4. Similar to ACK/NACK and CQI, slot hopping within a sub-frame is enabled across the two PUCCH regions at both UL system bandwidth edges.

In case the third length-2 orthogonal covering is not used to allow ACK/NACK and SRI sharing a common allocation scheme, the SRI capacity is reduced to the ACK/NACK capacity: 18 UEs per RB with normal cyclic prefix and 12 UEs per RB with extended cyclic prefix.

In another embodiment, C0-C11 represent 12 different amounts of phase ramp applied to a root CAZAC-like sequence. A cyclic shifted sequence is obtained by a cyclic shift operation on the root sequence, which is typically defined in the time domain. Phase ramped sequence is obtained by a phase ramp operation on the root sequences, which is typically defined in the frequency domain. The proposed method in this disclosure applies to both cyclic shifted sequences and phase ramped sequences.

In each OFDM symbol, a cyclically shifted or phase ramped CAZAC-like sequence is transmitted. The CAZAC-like sequence in an PUCCH DM RS OFDM symbol is un-modulated, or equivalently modulated/multiplied by 1. The CAZAC-like sequence in a data OFDM symbol is modulated by the data symbol. In case of a positive SRI transmission, the CAZAC-like sequence in a data OFDM symbol is modulated/multiplied by 1. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, \ 0 \leq n \leq M_{sc}^{RS}-1$$

where $M_{sc}^{RS}=12$ and $\phi(n)$ is defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

Definition of φ(n)

| u | φ(0), ..., φ(11) | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Figure 5:
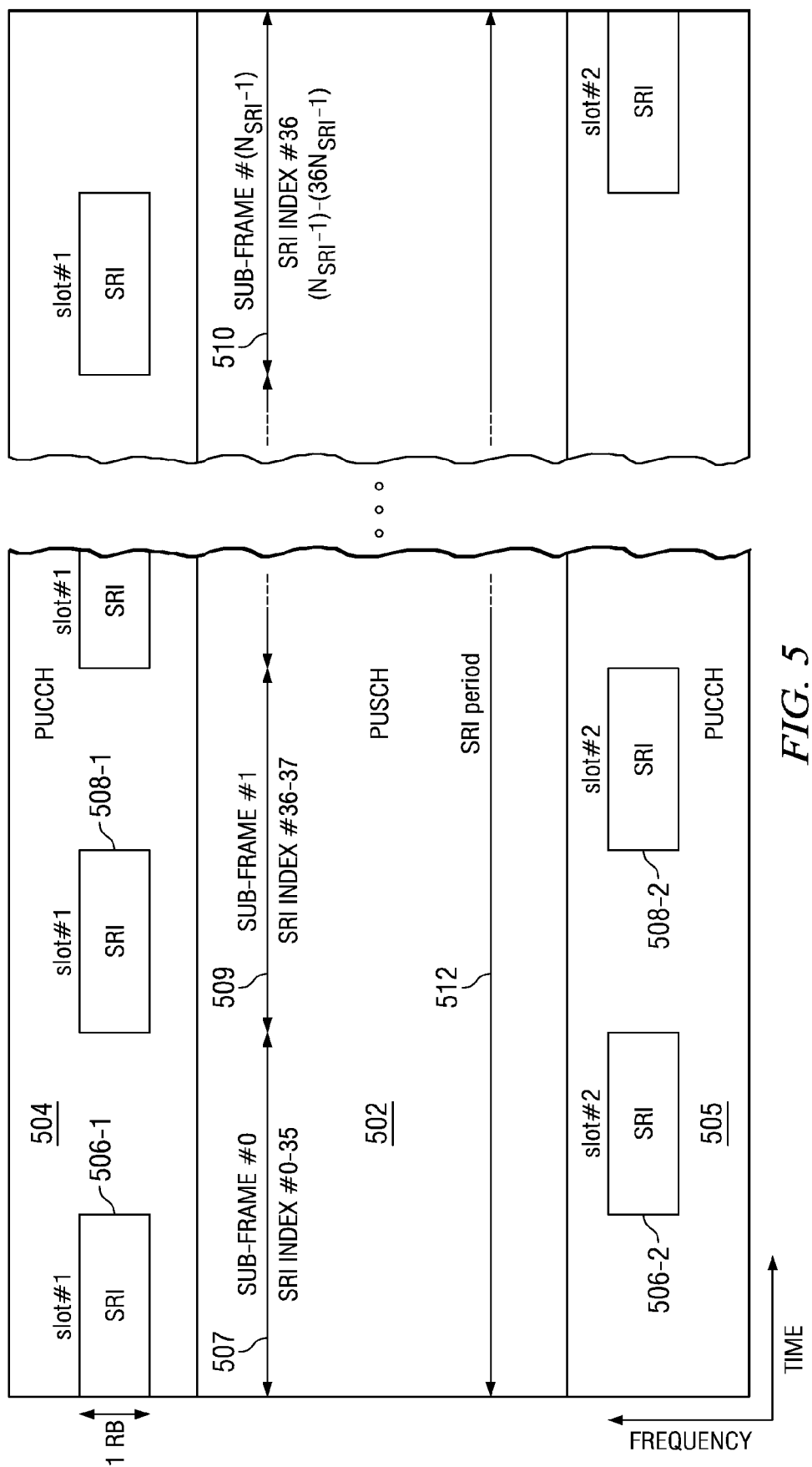
FIG. 5 is a frequency/time plot illustrating PUCCH and PUSCH, illustrating exemplary SRI resource time indexing per RB.

FIG. 5 is frequency vs. time plot illustrating PUSCH 502 and PUCCH 504, 505, with Scheduling Request Indicators transmitted in the PUCCH. In this patent application, without loss of generality, an SRI is sent on the PUCCH, as described with respect to FIGS. 3 and 4. As mentioned earlier, SRI is continuously allocated on one RB of the physical uplink control channel (PUCCH) such that thirty-six UEs can be multiplexed in one RB subframe, as indicated generally at 507. The next sequential subframe is indicated at 509 and can likewise support up to thirty-six UE. Within a sub-frame, the SRI hops at both edges of the system bandwidth on a slot basis. Each slot represents one-half of a subframe. For example, an SRI in slot 506-1 of subframe 507 is in the higher frequency edge 504 and the SRI is repeated in slot 506-2 of subframe 507 which is in the lower frequency edge 505 of the PUCCH. Similarly, slots 508-1, 508-2 carry SRI for the next set of thirty-six UE in subframe 509. In general, the first and second slot SRI sequences are the same, but they may be different in some embodiments.

One-to One SRI Resource Mapping

As indicated above, embodiments of the present invention provide a simple method for provisioning and allocating SRI resources on PUCCH, by forming a one-to-one mapping of a logical SRI index to physical resources, defined for all PUCCH RBs, as will now be described in more detail. The eNB may then signal the start and period of the SRI cycle, and allocate an SRI resource index to a UE through L3 signaling.

The following descriptions cover a cyclic shift separation of two between resources using the same orthogonal covering code, defined as:

$$\Delta_{shift}^{PUCCH}=2$$

A cyclic shift of two is expected to be the most common allocation. The following descriptions also cover cyclic shift separations of one and three. It is to be understood that other embodiments of the invention may use cyclic shift separation of four or larger using the principles described herein.

Embodiments of the invention use a fixed and simple SRI resource indexing based on a channelization structure and indexing at the subframe/RB level, followed by a time first, frequency (RB) 2nd ordering scheme, as elaborated in the following sections.

SRI Resource Indexing for the Sub-frame/RB Level—Short CP

Referring again to FIG. 3, the set of orthogonal covering sequences 302, 304, 306 is defined as follows in 3GPP TS 36.211 V8.4.0 (2008-09) "Technical Specification Group Radio Access Network; Evolved Universal Terrestrial Radio Access (E-UTRA); Physical Channels and Modulation (Release 8)" Tables 5.4.1-2, 5.4.1-3 and 5.5.2.2.1-2:

(1) Block spreading 1 (302): {c1,1, c1,2, c1,3} chosen from {(1,1,1,1), (1,1, −1, −1), (1, −1,−1,1), (1, −1,1, −1)}
(2) Block spreading 2 (304): {c2,1, c2,2, c2,3}={(1,1,1), (1, exp(j2pi/3), exp(j4pi/3)), (1, exp(j4pi/3), exp(j8pi/3))}
(3) Block spreading 3 (306): {c3,1, c3,2}={(1,1), (1, −1)}

Block spreading sequence 1 is summarized in Table 2. In a similar manner as used for the ACK/NACK channelization structure, only three out of the four sequences are used at a time for block spreading 1. Therefore, subsets of three sequences are defined to minimize the interference in high speed as illustrated in Table 2.

TABLE 2

Orthogonal code subsets for block spreading sequence 1

| Set index (Si) | $c_{1,1}$ | $c_{1,2}$ | $c_{1,3}$ |
|---|---|---|---|
| #1 | (1, 1, 1, 1) | (1, −1, 1, −1) | (1, −1, −1, 1) |
| #2 | (1, 1, −1, −1) | (1, −1, −1, 1) | (1, −1, 1, −1) |
| #3 | (1, −1, −1, 1) | (1, 1, −1, −1) | (1, 1, 1, 1) |
| #4 | (1, −1, 1, −1) | (1, 1, 1, 1) | (1, 1, −1, −1) |

The various possible code sets can be used alternately, so as to provide some interference randomization (slot-level orthogonal cover hopping). In addition, a staggered cyclic shift allocation should be used, where the most interfering code is allocated to an adjacent cyclic shift, as shown in Table 3. The different cyclic shift indexes (Si) reflect different possible alternate mappings, offset by one cyclic shift. The following sub-sections define channelization structures and resulting SRI resource indexing for the cases where a cyclic shift separation of one, two and three cyclic shifts is assumed between resources using the same orthogonal covering code.

A cyclic shift separation of two is expected to be the broader configuration usage and corresponds to most urban and sub-urban cell deployment scenarios. In this configuration, the SRI multiplexing capacity in one subframe/RB is:

$$N_{SRI}^{SFRB}=36$$

TABLE 3

Staggered cyclic shift allocation structure for block spreading 1&2, for Short CP and shift separation equal 2

| Cyclic shift | | Block spreading code 2 | | | Block spreading code 1 | | |
|---|---|---|---|---|---|---|---|
| Index 1 | Index 2 | $c_{2,1}$ | $c_{2,2}$ | $c_{2,3}$ | $c_{1,1}$ of Si | $c_{1,2}$ of Si | $c_{1,3}$ of Si |
| 0 | 1 | ✓ | ✓ | | ✓ | | ✓ |
| 1 | 2 | | ✓ | | | ✓ | |
| 2 | 3 | ✓ | ✓ | | ✓ | | ✓ |
| 3 | 4 | | ✓ | | | ✓ | |
| 4 | 5 | ✓ | ✓ | | ✓ | | ✓ |
| 5 | 6 | | ✓ | | | ✓ | |
| 6 | 7 | ✓ | ✓ | | ✓ | | ✓ |
| 7 | 8 | | ✓ | | | ✓ | |
| 8 | 9 | ✓ | ✓ | | ✓ | | ✓ |
| 9 | 10 | | ✓ | | | ✓ | |
| 10 | 11 | ✓ | ✓ | | ✓ | | ✓ |
| 11 | 0 | | ✓ | | | ✓ | |

Using the spreading codes as defined in Table 2 and Table 3, an embodiment of the present invention may use the RB/sub-frame level SRI resource indexing as described in Table 4

TABLE 4

RB/sub-frame level SRI channel indexing - Short CP

| Block spreading code 3 | Cyclic shift | | Block spreading code 2 | | | Block spreading code 1 | | |
|---|---|---|---|---|---|---|---|---|
| | Index 1 | Index 2 | c2, 1 | c2, 2 | c2, 3 | c1, 1 of Si | c1, 2 of Si | c1, 3 of Si |
| c3, 1 | 0 | 1 | 0 | | 12 | 0 | | 12 |
| | 1 | 2 | | 6 | | | 6 | |
| | 2 | 3 | 1 | | 13 | 1 | | 13 |
| | 3 | 4 | | 7 | | | 7 | |
| | 4 | 5 | 2 | | 14 | 2 | | 14 |
| | 5 | 6 | | 8 | | | 8 | |
| | 6 | 7 | 3 | | 15 | 3 | | 15 |
| | 7 | 8 | | 9 | | | 9 | |
| | 8 | 9 | 4 | | 16 | 4 | | 16 |
| | 9 | 10 | | 10 | | | 10 | |
| | 10 | 11 | 5 | | 17 | 5 | | 17 |
| | 11 | 0 | | 11 | | | 11 | |

TABLE 4-continued

RB/sub-frame level SRI channel indexing - Short CP

| Block spreading code 3 | Cyclic shift Index 1 | Index 2 | Block spreading code 2 c2,1 | c2,2 | c2,3 | Block spreading code 1 c1,1 of Si | c1,2 of Si | c1,3 of Si |
|---|---|---|---|---|---|---|---|---|
| c3, 2 | 0 | 1 | 18 |  | 30 | 18 |  | 30 |
|  | 1 | 2 |  | 24 |  |  | 24 |  |
|  | 2 | 3 | 19 |  | 31 | 19 |  | 31 |
|  | 3 | 4 |  | 25 |  |  | 25 |  |
|  | 4 | 5 | 20 |  | 32 | 20 |  | 32 |
|  | 5 | 6 |  | 26 |  |  | 26 |  |
|  | 6 | 7 | 21 |  | 33 | 21 |  | 33 |
|  | 7 | 8 |  | 27 |  |  | 27 |  |
|  | 8 | 9 | 22 |  | 34 | 22 |  | 34 |
|  | 9 | 10 |  | 28 |  |  | 28 |  |
|  | 10 | 11 | 23 |  | 35 | 23 |  | 35 |
|  | 11 | 0 |  | 29 |  |  | 29 |  |

A cyclic shift separation of three is expected to be used in cells with large delay spread (for example, some specific rural areas) but where a short CP is used. In this configuration, the SRI multiplexing capacity in one subframe/RB is $$N_{SRI}^{SFRB}=24$$

Table 5 illustrates a staggered cyclic shift allocation structure for block spreading sequence 1 and 2 for the short CP structure of FIG. 3, where the cyclic shift separation is three. As mentioned earlier, the multiple columns of cyclic shift indexes address different origins (or offsets) used to implement the cyclic shifts. For example, with a cyclic shift increment of 3, cyclic shifts of 0, 3, 6, . . . or 1, 4, 7, . . . or 2, 5, 8, . . . etc may be implemented.

TABLE 5

Staggered cyclic shift allocation structure for block spreading 1&2 - for Short CP and cyclic shift separation equal 3

| Cyclic shift Index 1 | Index 2 | Index 3 | Block spreading code 2 c2,1 | c2,2 | c2,3 | Block spreading code 1 c1,1 of Si | c1,2 of Si | c1,3 of Si |
|---|---|---|---|---|---|---|---|---|
| 0 | 1 | 2 | ✓ |  |  | ✓ |  |  |
| 1 | 2 | 3 |  | ✓ |  |  | ✓ |  |
| 2 | 3 | 4 |  |  | ✓ |  |  | ✓ |
| 3 | 4 | 5 | ✓ |  |  | ✓ |  |  |
| 4 | 5 | 6 |  | ✓ |  |  | ✓ |  |
| 5 | 6 | 7 |  |  | ✓ |  |  | ✓ |
| 6 | 7 | 8 | ✓ |  |  | ✓ |  |  |
| 7 | 8 | 9 |  | ✓ |  |  | ✓ |  |
| 8 | 9 | 10 |  |  | ✓ |  |  | ✓ |
| 9 | 10 | 11 | ✓ |  |  | ✓ |  |  |
| 10 | 11 | 0 |  | ✓ |  |  | ✓ |  |
| 11 | 0 | 1 |  |  | ✓ |  |  | ✓ |

Using the spreading codes as defined in Table 5 for a shift separation of three, an embodiment of the present invention may use the RB/sub-frame level SRI resource indexing as described in Table 6

TABLE 6

RB/sub-frame level SRI channel indexing, for short CP and shift separation = 3

| Block spreading code 3 | Cyclic shift Index 1 | Index 2 | Index 3 | Block spreading code 2 c2,1 | c2,2 | c2,3 | Block spreading code 1 c1,1 of Si | c1,2 of Si | c1,3 of Si |
|---|---|---|---|---|---|---|---|---|---|
| c3, 1 | 0 | 1 | 2 | 0 |  |  | 0 |  |  |
|  | 1 | 2 | 3 |  | 4 |  |  | 4 |  |
|  | 2 | 3 | 4 |  |  | 8 |  |  | 8 |
|  | 3 | 4 | 5 | 1 |  |  | 1 |  |  |
|  | 4 | 5 | 6 |  | 5 |  |  | 5 |  |
|  | 5 | 6 | 7 |  |  | 9 |  |  | 9 |
|  | 6 | 7 | 8 | 2 |  |  | 2 |  |  |
|  | 7 | 8 | 9 |  | 6 |  |  | 6 |  |
|  | 8 | 9 | 10 |  |  | 10 |  |  | 10 |
|  | 9 | 10 | 11 | 3 |  |  | 3 |  |  |
|  | 10 | 11 | 0 |  | 7 |  |  | 7 |  |
|  | 11 | 0 | 1 |  |  | 11 |  |  | 11 |

TABLE 6-continued

RB/sub-frame level SRI channel indexing, for short CP and shift separation = 3

| Block spreading code 3 | Cyclic shift | | | Block spreading code 2 | | | Block spreading code 1 | | |
|---|---|---|---|---|---|---|---|---|---|
| | Index 1 | Index 2 | Index 3 | c2, 1 | c2, 2 | c2, 3 | c1, 1 of Si | c1, 2 of Si | c1, 3 of Si |
| c3, 2 | 0 | 1 | 2 | 12 | | | 12 | | |
| | 1 | 2 | 3 | | 16 | | | 16 | |
| | 2 | 3 | 4 | | | 20 | | | 20 |
| | 3 | 4 | 5 | 13 | | | 13 | | |
| | 4 | 5 | 6 | | 17 | | | 17 | |
| | 5 | 6 | 7 | | | 21 | | | 21 |
| | 6 | 7 | 8 | 14 | | | 14 | | |
| | 7 | 8 | 9 | | 18 | | | 18 | |
| | 8 | 9 | 10 | | | 22 | | | 22 |
| | 9 | 10 | 11 | 15 | | | 15 | | |
| | 10 | 11 | 0 | | 19 | | | 19 | |
| | 11 | 0 | 1 | | | 23 | | | 23 |

A cyclic shift separation of one is expected to be used in cells with a small delay spread, in which case the SRI multiplexing capacity can be increased to 72 SRIs in one subframe/RB, such that:

$N_{SRI}^{SFRB} = 72$

Table 7 illustrates a staggered cyclic shift allocation structure for block spreading sequence 1 and 2 for the short CP structure of FIG. 3, where the cyclic shift separation is one.

TABLE 7

Staggered cyclic shift allocation structure for block spreading 1&2, for short CP and cyclic shift separation equal one

| Cyclic shift index | Block spreading code 2 | | | Block spreading code 1 | | |
|---|---|---|---|---|---|---|
| | c2, 1 | c2, 2 | c2, 3 | c1, 1 of Si | c1, 2 of Si | c1, 3 of Si |
| 0 | ✓ | ✓ | ✓ | ✓ | ✓ | ✓ |
| 1 | ✓ | ✓ | ✓ | ✓ | ✓ | ✓ |
| 2 | ✓ | ✓ | ✓ | ✓ | ✓ | ✓ |
| 3 | ✓ | ✓ | ✓ | ✓ | ✓ | ✓ |
| 4 | ✓ | ✓ | ✓ | ✓ | ✓ | ✓ |
| 5 | ✓ | ✓ | ✓ | ✓ | ✓ | ✓ |
| 6 | ✓ | ✓ | ✓ | ✓ | ✓ | ✓ |
| 7 | ✓ | ✓ | ✓ | ✓ | ✓ | ✓ |
| 8 | ✓ | ✓ | ✓ | ✓ | ✓ | ✓ |
| 9 | ✓ | ✓ | ✓ | ✓ | ✓ | ✓ |
| 10 | ✓ | ✓ | ✓ | ✓ | ✓ | ✓ |
| 11 | ✓ | ✓ | ✓ | ✓ | ✓ | ✓ |

Using the spreading codes as defined in Table 7 for a shift separation of one, an embodiment of the present invention may use the RB/sub-frame level SRI resource indexing as described in Table 8.

TABLE 8

RB/sub-frame level SRI channel indexing, for short CP and shift separation = 1

| Block spreading code 3 | Cyclic shift index | Block spreading code 2 | | | Block spreading code 1 | | |
|---|---|---|---|---|---|---|---|
| | | c2,1 | c2,2 | c2,3 | c1,1 of Si | c1,2 of Si | c1,3 of Si |
| c3,1 | 0 | 0 | 12 | 24 | 0 | 12 | 24 |
| | 1 | 1 | 13 | 25 | 1 | 13 | 25 |

TABLE 8-continued

RB/sub-frame level SRI channel indexing, for short CP and shift separation = 1

| Block spreading code 3 | Cyclic shift index | Block spreading code 2 | | | Block spreading code 1 | | |
|---|---|---|---|---|---|---|---|
| | | c2,1 | c2,2 | c2,3 | c1,1 of Si | c1,2 of Si | c1,3 of Si |
| | 2 | 2 | 14 | 26 | 2 | 14 | 26 |
| | 3 | 3 | 15 | 27 | 3 | 15 | 27 |
| | 4 | 4 | 16 | 28 | 4 | 16 | 28 |
| | 5 | 5 | 17 | 29 | 5 | 17 | 29 |
| | 6 | 6 | 18 | 30 | 6 | 18 | 30 |
| | 7 | 7 | 19 | 31 | 7 | 19 | 31 |
| | 8 | 8 | 20 | 32 | 8 | 20 | 32 |
| | 9 | 9 | 21 | 33 | 9 | 21 | 33 |
| | 10 | 10 | 22 | 34 | 10 | 22 | 34 |
| | 11 | 11 | 23 | 35 | 11 | 23 | 35 |
| c3,2 | 0 | 36 | 48 | 60 | 36 | 48 | 60 |
| | 1 | 37 | 49 | 61 | 37 | 49 | 61 |
| | 2 | 38 | 50 | 62 | 38 | 50 | 62 |
| | 3 | 39 | 51 | 63 | 39 | 51 | 63 |
| | 4 | 40 | 52 | 64 | 40 | 52 | 64 |
| | 5 | 41 | 53 | 65 | 41 | 53 | 65 |
| | 6 | 42 | 54 | 66 | 42 | 54 | 66 |
| | 7 | 43 | 55 | 67 | 43 | 55 | 67 |
| | 8 | 44 | 56 | 68 | 44 | 56 | 68 |
| | 9 | 45 | 57 | 69 | 45 | 57 | 69 |
| | 10 | 46 | 58 | 70 | 46 | 58 | 70 |
| | 11 | 47 | 59 | 71 | 47 | 59 | 71 |

SRI Resource Indexing for Sub-frame/RB Level—Long CP

For the long CP structure of FIG. 4, a set of orthogonal covering sequences is defined as follows by 3GPP TS 36.211 V8.4.0 (2008-09) Tables 5.4.1-2, 5.4.1-3 and 5.5.2.2.1-2:

(4) Block spreading 1: $\{c_{1,1}, c_{1,2}\}$ chosen from $\{(1,1,1,1), (1,1, -1, -1), (1, -1, -1,1), (1, -1,1, -1)\}$ (see Table 9 below)

(5) Block spreading 2: $\{c_{2,1}, c_{2,2}\} = \{(1,1), (1, -1)\}$ (6) Block spreading 3: $\{c_{3,1}, c_{3,2}\} = \{(1,1), (1, -1)\}$ Two out of the four sequences are used at a time for block spreading sequence 1. Therefore, it is possible to always select the optimal sequences which remain orthogonal even at high speed, as shown in Table 9.

TABLE 9

Orthogonal code subsets for block spreading sequence 1

| Set index (Si) | $c_{1,1}$ | $c_{1,2}$ |
|---|---|---|
| #1 | (1, 1, 1, 1) | (1, -1, -1, 1) |
| #2 | (1, 1, -1, -1) | (1, -1, 1, -1) |
| #3 | (1, -1, -1, 1) | (1, 1, 1, 1) |
| #4 | (1, -1, 1, -1) | (1, 1, -1, -1) |

A cyclic shift separation of two is expected to be the broader configuration usage and corresponds to most urban and sub-urban cell deployment scenarios. In this configuration, the SRI multiplexing capacity in one subframe/RB is 24. Given the good performance of the above codes, there is no such need to introduce a staggered structure, as for the short CP case. Therefore, the two possible channelization structures are given in Table 10 (non-staggered) and Table 11 (staggered).

TABLE 10

Cyclic shift allocation structure for block spreading 1&2, Non staggered, Long CP, shift separation = 2

| Cyclic shift | | Block spreading code 2 | | Block spreading code 1 | |
|---|---|---|---|---|---|
| Index1 | Index 2 | $c_{2,1}$ | $c_{2,2}$ | $c_{1,1}$ of Si | $c_{1,2}$ of Si |
| 0 | 1 | ✓ | ✓ | ✓ | ✓ |
| 1 | 2 | | | | |
| 2 | 3 | ✓ | ✓ | ✓ | ✓ |
| 3 | 4 | | | | |
| 4 | 5 | ✓ | ✓ | ✓ | ✓ |
| 5 | 6 | | | | |
| 6 | 7 | ✓ | ✓ | ✓ | ✓ |
| 7 | 8 | | | | |
| 8 | 9 | ✓ | ✓ | ✓ | ✓ |
| 9 | 10 | | | | |
| 10 | 11 | ✓ | ✓ | ✓ | ✓ |
| 11 | 0 | | | | |

TABLE 11

Cyclic shift allocation structure for block spreading 1&2, Staggered, Long CP, shift separation = 2

| Cyclic shift | | Block spreading code 2 | | Block spreading code 1 | |
|---|---|---|---|---|---|
| Index1 | Index 2 | $c_{2,1}$ | $c_{2,2}$ | $c_{1,1}$ of Si | $c_{1,2}$ of Si |
| 0 | 1 | ✓ | | ✓ | |
| 1 | 2 | | ✓ | | ✓ |
| 2 | 3 | ✓ | | ✓ | |
| 3 | 4 | | ✓ | | ✓ |
| 4 | 5 | ✓ | | ✓ | |
| 5 | 6 | | ✓ | | ✓ |
| 6 | 7 | ✓ | | ✓ | |
| 7 | 8 | | ✓ | | ✓ |
| 8 | 9 | ✓ | | ✓ | |
| 9 | 10 | | ✓ | | ✓ |
| 10 | 11 | ✓ | | ✓ | |
| 11 | 0 | | ✓ | | ✓ |

An embodiment of the present invention may use the RB/sub-frame level SRI resource indexing as described in Table 12 where indexes formatted as (i) apply to the staggered structure in Table 11.

TABLE 12

RB/sub-frame level SRI channel indexing, Long CP, shift separation = 2

| Block spreading code 3 | Cyclic shift | | Block spreading code 2 | | Block spreading code 1 | |
|---|---|---|---|---|---|---|
| | Index 1 | Index 2 | $c_{2,1}$ | $c_{2,2}$ | $c_{1,1}$ of Si | $c_{1,2}$ of Si |
| c3, 1 | 0 | 1 | 0 | 6 | 0 | 6 |
| | 1 | 2 | | (6) | | (6) |
| | 2 | 3 | 1 | 7 | 1 | 7 |
| | 3 | 4 | | (7) | | (7) |
| | 4 | 5 | 2 | 8 | 2 | 8 |
| | 5 | 6 | | (8) | | (8) |
| | 6 | 7 | 3 | 9 | 3 | 9 |
| | 7 | 8 | | (9) | | (9) |
| | 8 | 9 | 4 | 10 | 4 | 10 |
| | 9 | 10 | | (10) | | (10) |
| | 10 | 11 | 5 | 11 | 5 | 11 |
| | 11 | 0 | | (11) | | (11) |
| c3, 2 | 0 | 1 | 12 | 18 | 12 | 18 |
| | 1 | 2 | | (18) | | (18) |
| | 2 | 3 | 13 | 19 | 13 | 19 |
| | 3 | 4 | | (19) | | (19) |
| | 4 | 5 | 14 | 20 | 14 | 20 |
| | 5 | 6 | | (20) | | (20) |
| | 6 | 7 | 15 | 21 | 15 | 21 |
| | 7 | 8 | | (21) | | (21) |
| | 8 | 9 | 16 | 22 | 16 | 22 |
| | 9 | 10 | | (22) | | (22) |
| | 10 | 11 | 17 | 23 | 17 | 23 |
| | 11 | 0 | | (23) | | (23) |

A cyclic shift separation of three is expected to be used in cells with large delay spread (e.g. some specific rural areas). In this configuration, the SRI multiplexing capacity in one subframe/RB is $$N_{SRI}^{SFRB} = 16$$

Table 13 illustrates a staggered cyclic shift allocation structure for block spreading sequence 1 and 2 for the long CP structure of FIG. 4, where the cyclic shift separation is three.

TABLE 13

Cyclic shift allocation structure for block spreading 1&2, Staggered, Long CP, shift separation = 3

| Cyclic shift | | | Block spreading code 2 | | Block spreading code 1 | |
|---|---|---|---|---|---|---|
| Index 1 | Index 2 | Index 3 | $c_{2,1}$ | $c_{2,2}$ | $c_{1,1}$ of Si | $c_{1,2}$ of Si |
| 0 | 1 | 2 | ✓ | | ✓ | |
| 1 | 2 | 3 | | ✓ | | ✓ |
| 2 | 3 | 4 | | | | |
| 3 | 4 | 5 | ✓ | | ✓ | |
| 4 | 5 | 6 | | ✓ | | ✓ |
| 5 | 6 | 7 | | | | |
| 6 | 7 | 8 | ✓ | | ✓ | |
| 7 | 8 | 9 | | ✓ | | ✓ |
| 8 | 9 | 10 | | | | |
| 9 | 10 | 11 | ✓ | | ✓ | |
| 10 | 11 | 0 | | ✓ | | ✓ |
| 11 | 0 | 1 | | | | |

Using the spreading codes as defined in Table 13 for a shift separation of three, an embodiment of the present invention may use the RB/sub-frame level SRI resource indexing as described in Table 14

TABLE 14

RB/sub-frame level SRI channel indexing, Long CP, shift separation = 3

| Block spreading code 3 | Cyclic shift | | | Block spreading code 2 | | Block spreading code 1 | |
|---|---|---|---|---|---|---|---|
| | Index 1 | Index 2 | Index 3 | c2, 1 | c2, 2 | c1, 1 of Si | c1, 2 of Si |
| c3, 1 | 0 | 1 | 2 | 0 | | 0 | |
| | 1 | 2 | 3 | | 4 | | 4 |
| | 2 | 3 | 4 | | | | |
| | 3 | 4 | 5 | 1 | | 1 | |
| | 4 | 5 | 6 | | 5 | | 5 |
| | 5 | 6 | 7 | | | | |
| | 6 | 7 | 8 | 2 | | 2 | |
| | 7 | 8 | 9 | | 6 | | 6 |
| | 8 | 9 | 10 | | | | |
| | 9 | 10 | 11 | 3 | | 3 | |
| | 10 | 11 | 0 | | 7 | | 7 |
| | 11 | 0 | 1 | | | | |
| c3, 2 | 0 | 1 | 2 | 8 | | 8 | |
| | 1 | 2 | 3 | | 12 | | 12 |
| | 2 | 3 | 4 | | | | |
| | 3 | 4 | 5 | 9 | | 9 | |
| | 4 | 5 | 6 | | 13 | | 13 |
| | 5 | 6 | 7 | | | | |
| | 6 | 7 | 8 | 10 | | 10 | |
| | 7 | 8 | 9 | | 14 | | 14 |
| | 8 | 9 | 10 | | | | |
| | 9 | 10 | 11 | 11 | | 11 | |
| | 10 | 11 | 0 | | 15 | | 15 |
| | 11 | 0 | 1 | | | | |

In case the third length-2 orthogonal covering is not used to allow ACK/NACK and SRI sharing a common allocation scheme, the above Tables 4, 6, 8, 12, and 14 reduce to their upper part where only channelization code $c_{3,1}$ is used.

Channelization Formulas and Sequence/Cyclic Shift Hopping

The above Tables 4, 6, 8, 12, and 14 can be used to identify the channelization resource uniformly across all SC-OFDM symbols of one 1 ms subframe. Another possibility is that resource re-mapping is enabled at a symbol level for the cyclic shift resource and at a slot level for the orthogonal covering resource within the RB/subframe according to a cell-specific or resource specific hopping pattern or a mix of both. The purpose of intra subframe resource hopping is to randomize the intra and inter-cell interference. In that case, the above tables define the channelization resource of the first symbol of the subframe, provided resource hopping is enabled across following symbols within the channelization framework defined by the above tables. This can be captured analytically as described in the following paragraphs.

Let $N_{SC}^{RB}=12$ be the number of sub-carriers in one resource block (RB) and, as a consequence, the maximum number of cyclic shifts per RB. As defined in the above sections, $\Delta_{shift}^{PUCCH}$ shift is the cyclic shift separation between resources using the same orthogonal covering code and $N_{SRI}^{SFRB}$ is the SRI multiplexing capacity in one subframe/RB, given $\Delta_{shift}^{PUCCH}$. Let $n_{SRI}$ denote the SRI channel (or resource) index, where $n_{SRI}$ is non-negative integer such that $$0 \leq n_{SRI} < N_{SRI}^{SFRB}, \text{ and where} \quad (7)$$

$$N_{SRI}^{SFRB} = \begin{cases} 6N_{SC}^{RB}/\Delta_{shift}^{PUCCH} & \text{for normal cyclic prefix} \\ 4N_{SC}^{RB}/\Delta_{shift}^{PUCCH} & \text{for extended cyclic prefix} \end{cases}$$

Denote $$n_{OC,1}^{(n_s)}$$

a non-negative integer such that $$0 \leq n_{OC,1}^{(n_s)} < 3;$$

indexing the sequence $$c_{1,\left\{n_{OC,1}^{(n_s)}+1\right\}}$$

of "block spreading code 1" defined by (1), to be used in slot $n_s$ of the subframe.

Denote $$n_{OC,2}^{(n_s)}$$

a non-negative integer such that $$0 \leq n_{OC,2}^{(n_s)} < 3;$$

indexing the sequence $$c_{1,\left\{n_{OC,2}^{(n_s)}+1\right\}}$$

of "block spreading code 2" defined by (2), to be used in slot $n_s$ of the subframe.

Denote $$n_{OC,3}^{(n_s)}$$

a non-negative integer such that $$0 \leq n_{OC,3}^{(n_s)} < 2;$$

indexing the sequence $$c_{1,\left\{n_{OC,3}^{(n_s)}+1\right\}}$$

of "block spreading code 3" defined in (3), to be used in slot $n_s$ of the subframe.

Resources used for SRI transmission on PUCCH are identified by the resource index $n_{SRI}$ from which the orthogonal sequence indexes $$n_{OC,1}^{(n_s)}, n_{OC,2}^{(n_s)}, n_{OC,3}^{(n_s)},$$

and the cyclic shift $\alpha(l)$ are determined according to:

$$n_{OC,1}^{(n_s)} = (n_{OC,1}^{(0)} + f_1(n_s)) \bmod 3 \quad (8)$$

$$n_{OC,2}^{(n_s)} = (n_{OC,2}^{(0)} + f_2(n_s)) \bmod 3 \quad (9)$$

$$n_{OC,3}^{(n_s)} = (n_{OC,3}^{(0)} + f_3(n_s)) \bmod 3 \quad (10)$$

$$\alpha(l) = (\alpha^{(0)} + f_4(l)) \bmod N_{SC}^{RB} \quad (11)$$

where $$n_{OC,1}^{(0)} = \quad (12)$$
$$\begin{cases} \lfloor (n_{SRI} \bmod (N_{SRI}^{SFRB}/2)) \Delta_{shift}^{PUCCH} / N_{SC}^{RB} \rfloor & \text{for normal cyclic prefix} \\ 2\lfloor (n_{SRI} \bmod (N_{SRI}^{SFRB}/2)) \Delta_{shift}^{PUCCH} / N_{SC}^{RB} \rfloor & \text{for extended cyclic prefix} \end{cases}$$

$$n_{OC,2}^{(0)} = \lfloor (n_{SRI} \bmod (N_{SRI}^{SFRB}/2)) \Delta_{shift}^{PUCCH} / N_{SC}^{RB} \rfloor \quad (13)$$

$$n_{OC,3}^{(0)} = \lfloor 2n_{SRI} / N_{SRI}^{SFRB} \rfloor \quad (14)$$

$$\alpha^{(0)} = \begin{cases} \left( \begin{array}{l} (n_{SRI} \bmod (N_{SRI}^{SFRB}/2)) \Delta_{shift}^{PUCCH} + \\ \delta_{offset}^{PUCCH} + (n_{OC,1}^{(0)} \bmod \Delta_{shift}^{PUCCH}) \end{array} \right) \bmod N_{SC}^{RB} & \text{normal } cp \\ \left( \begin{array}{l} (n_{SRI} \bmod (N_{SRI}^{SFRB}/2)) \Delta_{shift}^{PUCCH} + \\ \delta_{offset}^{PUCCH} + n_{OC,2}^{(0)} \end{array} \right) \bmod N_{SC}^{RB} & \text{extended } cp \end{cases} \quad (15)$$

and $f_1(n_s)$, $f_2(n_s)$, $f_3(n_s)$ represent index hopping functions varying per slot and $f_4(l)$ represents index hopping function varying per symbol.

It should be noted that if orthogonal cover hopping is applied to both $$n_{OC,1}^{(n_s)} \text{ and } n_{OC,2}^{(n_s)}$$

through hopping functions $f_1(n_s)$ and $f_2(n_s)$, then any additional hopping on top will not improve the performance significantly so that the most likely hopping function for $$n_{OC,3}^{(n_s)} \text{ is } f_3(ns)=0.$$

RB Level

For a given RB, the number of time-multiplexed UEs is limited by the SRI period, which is generally set to 10 ms. Therefore, embodiments of the invention pursue the SRI channel indexing beyond the sub-frame level over an entire SRI period. Given the SRI period $N_{SRI}$ expressed in number subframes (e.g. $N_{SRI}$=10), the SRI channel index starts incrementing within the same RB from the first subframe of the SRI period until the last subframe of the SRI period. Formally, if S0 is the number of the first subframe of an SRI period, the SRI resource indexed by n is located in subframe $$S0 + \lfloor n/N_{SRI}^{SFRB} \rfloor$$

on the channelization resource indexed by (n mod $N_{SRI}^{SFRB}$) in Table 4, 6, 8, 12, 14. $N_{SRI}^{SFRB}$ is the SRI multiplexing capacity in one subframe/RB and it's possible values are defined in previous descriptions.

Referring again to FIG. 5, SRI resource indexing 507, 509, 510 illustrates indexing per RB across the entire SRI period 512. FIG. 5 illustrates the short CP structure with shift separation equal two; however the indexing scheme is similar for other shift separation values and for the long CP structure.

PUCCH Level

Figure 6:
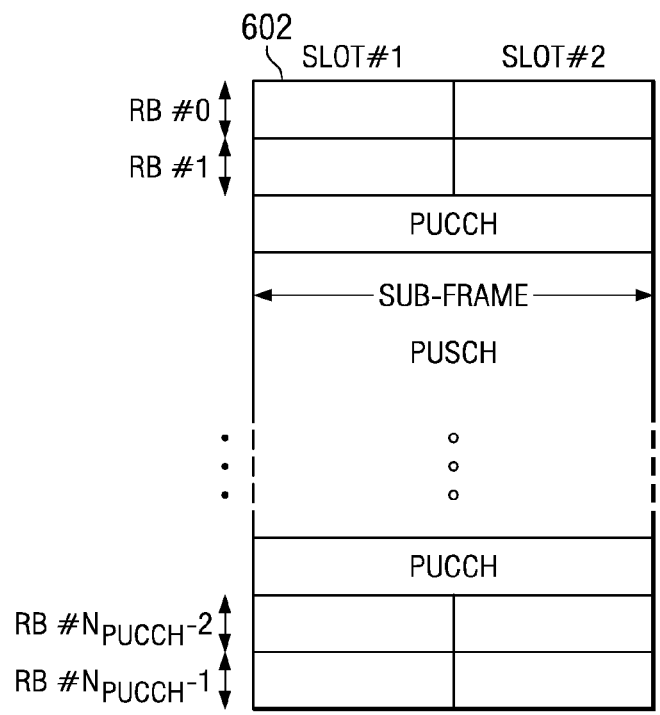
FIG. 6 is a frequency/time plot illustrating PUCCH and PUSCH, illustrating exemplary resource block indexing.

FIG. 6 is a frequency/time plot illustrating PUCCH and PUSCH, illustrating exemplary resource block indexing. The last multiplexing dimension is the frequency, or RB. Embodiments of the invention pursue the time indexing, as described above, across all RBs of the PUCCH, starting from RB 602 at the extreme upper end of the PUCCH, as illustrated in FIG. 6, where $N_{PUCCH}$ RBs are allocated to the PUCCH. As a result, the SRI resource indexed by n is located in PUCCH RB # (16)

$$\lfloor n/N_{SRI}^{SFRB} N_{SRI} \rfloor, \text{ subframe } S0 + \lfloor (n \bmod N_{SRI}^{SFRB} N_{SRI}) / N_{SRI}^{SFRB} \rfloor$$

on the channelization resource indexed by $$(n \bmod N_{SRI}^{SFRB})$$

in Table 4, 6, 8, 12, 14.

The SRI index ordering, described above with reference to Equation (16), is mapped onto physical resources according to a time first, RB (frequency) second ordering. An alternate embodiment can use a frequency first, time second ordering scheme. In yet another embodiment, the SRI index can only span the channelization indexing addressed with reference to Tables 2-14 and the frequency RBs of a given subframe, while the subframe index is configured separately.

SRI Allocation

Whenever an SRI resource has been allocated to an UL synchronized UE, it does not need to change since its period is not dependent on varying conditions such as the radio channel. Moreover an SRI transmission is not linked to any scheduled allocation conveyed on the PDCCH. As a result, the SRI index allocation to a UE may be done through L3 signaling embedded in a MAC (media access control) PDU (protocol data unit) on PDSCH. It should be noted that the SRI index as defined herein spans the whole PUCCH region. This is obviously over-provisioning since the SRI shares the PUCCH with the ACK/NACK and CQI channels, and in practice, it is the responsibility of the eNB, when assigning the SRI indexes to the UEs, to choose which RBs/cyclic shifts/codes will be allocated for SRI transmission. So this only results in over-dimensioning the SRI index bit-width. Therefore, in an alternative embodiment, an eNB may configure and signal a reduced number of PUCCH RBs to be used for SRI transmission. In that case, the same mapping applies as described in with regard to FIG. 6, except that RB indexing is limited to those PUCCH RBs configured to support SRI transmission. However, this would require an additional SRI parameter to be broadcast as part of the system information which will increase the overhead on SIBs (system information blocks). On the other hand, as already mentioned, the SRI index is expected to be sent very infrequently so some amount of over-dimensioning should not be an issue. Also, reducing the number of parameters the eNB needs to configure results in a simpler design.

SRI Signaling Requirements

From the above Sections, the signaling requirements in support of the SRI can be reduced to:

The SRI cycle period—broadcast as system information
The SRI cycle offset (e.g. with respect to SFN=0)—broadcast as system information
UE-specific SRI resource allocation (SRI index): L3 signaling in MAC PDU on PDSCH In an alternate embodiment, the SRI channel can be configured as follows:

The SRI cycle period—broadcast as system information
UE-specific SRI resource allocation (SRI index): L3 signaling in MAC PDU on PDSCH UE-specific subframe offset, which tells the UE the subframe within the SRI cycle period it has been assigned an SRI channel UE-specific $n_{PUCCH}^{(1)}$ index as the SRI resource within the above subframe, $n_{PUCCH}^{(1)}$ plays the same role as the SRI index n, except that it is restricted to one sub-frame; the middle term identifying the subframe# is not accounted in equation 16. As a result, the eNB has to signal both $n_{PUCCH}^{(1)}$ and the sub-frame offset to the UE, which will necessarily require more bits compared to the case where both time and frequency/channelization indexes are merged. However, this UE-specific RRC allocation is expected to occur quite infrequently, which should cause too much overhead. On the other hand, this approach presents a common interface with persistent A/N allocations for which the subframe offset is UE-specific, which makes overall design simpler.

Note it is possible for NodeB to inform each UE the SRI cycle period via higher layer signaling (i.e. RRC (radio resource control) or L3 (layer 3 of the protocol stack)). The SRI cycle period is typically common to all UEs in the systems. It is not precluded that UE-specific SRI cycle period is implemented.

In another embodiment, the SRI cycle period and the subframe offset can be UE-specific parameters conveyed though L3 signaling in MAC PDU on PDSCH, and grouped into a single index, denoted $I_{SR}$, while $n_{PUCCH}^{(1)}$ is also a UE-specific parameter, but configured separately. Table 15 below gives an example of mapping of the $I_{SR}$ index onto pre-defined SRI period and subframe offset values.

TABLE 15

UE-specific SRI periodicity and subframe offset configuration

| SRI configuration Index $I_{SR}$ | SRI periodicity (ms) | SRI subframe offset |
|---|---|---|
| 0-4 | 5 | $I_{SR}$ |
| 5-14 | 10 | $I_{SR}$ − 5 |
| 15-34 | 20 | $I_{SR}$ − 15 |
| 35-74 | 40 | $I_{SR}$ − 35 |
| 75-154 | 80 | $I_{SR}$ − 75 |
| 155 | OFF | N/A |

In this disclosure, a L3 signaling in MAC PDU on PDSCH is sometimes denoted as RRC signaling, or higher layer signaling, or any other equivalent term.

Figure 7:
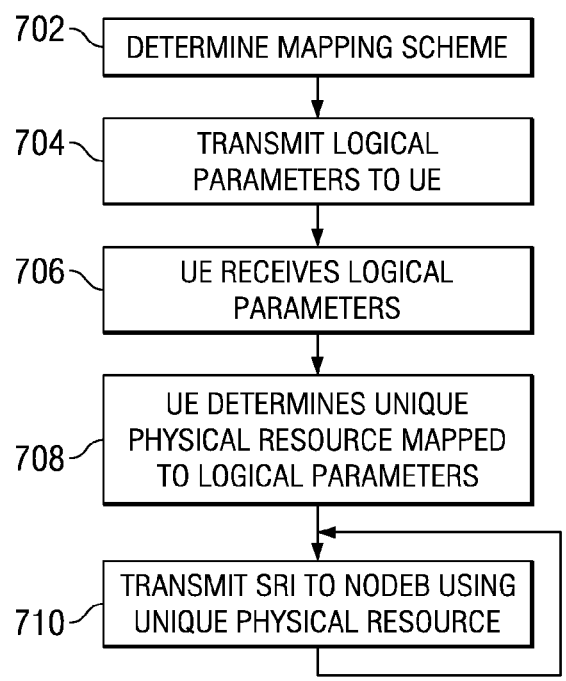
FIG. 7 is a flow diagram illustrating allocation and transmission of SRI according to an embodiment of the present invention.

FIG. 7 is a flow diagram illustrating allocation and transmission of SRI according to an embodiment of the present invention. As described above, orthogonal block spreading codes can be applied to multiple users for simultaneous transmission within the same frequency—time resource. This scheme is used for transmission of SRI. When a UE enters a cell, it receives 706 from the NodeB serving the cell an allocation of a set of periodic transmission instances for SRI. It also receives configuration information to instruct it as to which channel resources it is to use for transmission.

Prior to this, the NodeB determines 702 a mapping scheme that will be used to allocate a unique physical resource to UE within the cell(s) controlled by the NodeB for transmission of SRI. Typically, this will be done when the NodeB is installed or when the network is later reconfigured or the cell size changed and will generally depend on the physical size and location of the cells served by the NodeB. As discussed above, the mapping scheme depends on the type of CP selected, the cyclic shift separation that will be used within the cell, orthogonal covering sequences, and the number of RB that will be allocated for SRI use. Once these details are decided, UE that operate in the network are configured accordingly so that each UE is aware of the chosen mapping scheme. This may typically be done when the UE is initialized for use in the network, such as when a cell phone is purchased. It may also be done later via control messages.

As each UE enters a cell and becomes identified to the NodeB serving the cell, the NodeB will then transmit 704 to the UE a set of parameters that allow the UE to determine a unique combination of cyclic shift, RS orthogonal cover, data orthogonal cover, and resource block number for the first UE to use as a unique physical resource for an SRI in the physical uplink control channel (PUCCH). This includes transmitting an SRI cycle period for use by user equipment (UE) within a cell, transmitting a specific SRI subframe offset to a particular UE, and transmitting an index value to the particular UE. The SRI cycle period is common to all UE within a cell, so this parameter may be broadcast to all UE within the cell, or it may be transmitted specifically to each UE as it enters the cell. For example, the NodeB may inform each UE the SRI cycle period via higher layer signaling using RRC or L3. Similarly, since the mapping does not need to change, the NodeB may inform each UE the specific offset and index parameter values using RRC or L3.

When a UE receives 706 the logical parameters that define the SRI resource to use, it determines 708 a unique combination of cyclic shift, RS orthogonal cover, data orthogonal cover, and resource block number for the UE to use as a unique physical resource for an SRI in the physical uplink control channel (PUCCH). This is done by mapping the received parameters to select a unique physical resource using a one-to-one mapping scheme as described above, with respect to FIGS. 3-5.

During a normal course of operation, whenever a given UE has a scheduling request to transmit, it transmits 710 a positive (or ON) SRI according to its unique physical resource SRI allocation and receives further resource allocations using the three step procedure described with respect to FIG. 2. This is repeated each time the UE has a scheduling request to transmit. An SRI transmission may be made as often as each SRI period, which is typically 10 ms.

Figure 8:
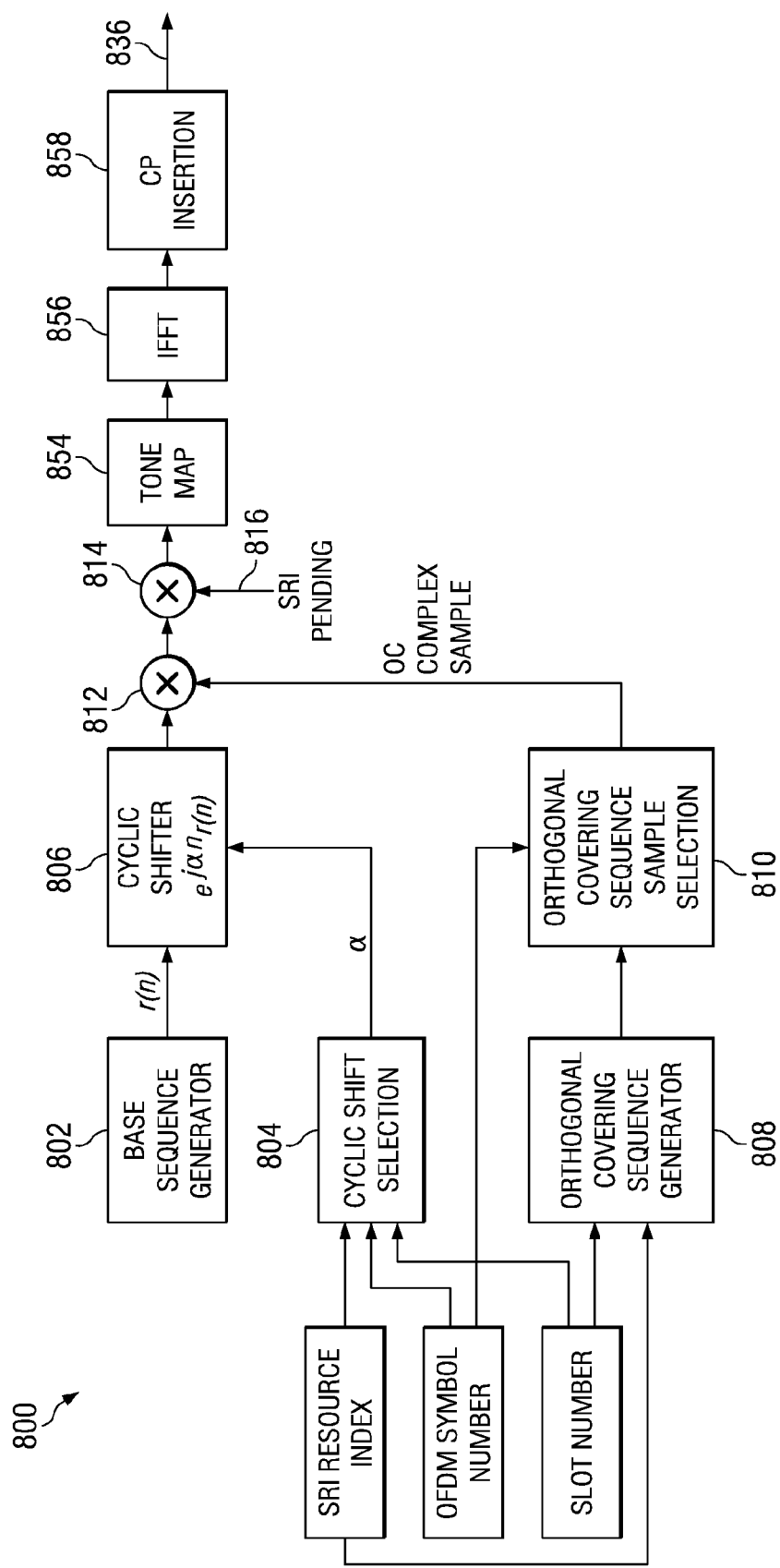
FIG. 8 is a block diagram of a transmitter structure for transmitting the SRI structures of FIGS. 3-4.

FIG. 8 is a block diagram of a transmitter structure 800 for transmitting the coherent structures of FIGS. 3-5. Elements of transmitter 800 may be implemented as components in a fixed or programmable processor by executing instructions stored in memory. A pre-defined set of sequences is defined. The UE generates in frequency domain a CAZAC-like (e.g. ZC or extended ZC or zero-autocorrelation QPSK computer-generated) sequence using base sequence generator 802. A cyclic shift value is selected for each symbol based on the SRI resource index, the OFDM symbol number and the slot number in cyclic shift selecting module 804. The base sequence is then shifted by cyclic shifter 806 in frequency domain, i.e. by applying a phase ramp on a symbol by symbol basis using shift values provided by cyclic shift selection module 804. The exact values that are used to form the SRI shifted sequences are determined by the UE by mapping the logical index value and SRI subframe offset received from a NodeB that is serving the cell in which the UE is located to a unique combination of cyclic shift, RS orthogonal cover, data orthogonal cover, and resource block number for the first UE to use as a unique physical resource for an SRI in the physical uplink control channel (PUCCH).

Referring again to FIGS. 3 and 4, the UE generates three orthogonal covering sequences 302, 304, 306 or 402, 404, 406, for example, using orthogonal sequence generator 808. Orthogonal sequence generator 808 generates one sequence out of the set of orthogonal sequences based on the SRI resource index, as described above, for each of the three covering sequences. The orthogonal covering sequence sample selection 810 selects and issues the appropriate sequence sample from the covering sequence based on the index of the OFDM symbol being currently generated. The cyclic shifted base sequence vector is element-wise complex-multiplied by the selected orthogonal covering complex sample in complex multiplier 812.

The result of the element-wise complex multiplication is then modulated by multiplying by one in multiplier 814 if an SRI is pending, as indicated by SRI logic 816 or by multiplying by zero if an SRI is not pending. Other embodiments may implement the on-off keying for SRI modulation in other manners, such as by not forming the sequences at all.

The SRI sequences are then mapped onto a designated set of tones (sub-carriers) using Tone Map 854. Additional signals or zero—padding may or may not be present. The UE next performs IFFT of the mapped signal using the IFFT 856 to transform the OFDM signal back to the time domain. The CP is then formed using a portion of the OFDM signal output from IFFT 856 and appended to the OFDM signal to form the complete SC-OFDM symbol which is output to the transmitter (not shown). Formation of the SC-OFDM symbol is controlled as described above so that both an SRS and an SRI are not formed in the same symbol.

In some embodiments, the inverse Fast Fourier Transform (IFFT) block in 856 may be implemented using an Inverse Discrete Fourier Transform (IDFT). In other embodiments, the order of cyclic shifter 806, tone map 854 and IFFT 856 may be arranged in various combinations. For example, in one embodiment tone mapping is performed on a selected root sequence, IDFT is then performed on the mapped tones and then a cyclic shift may be performed. In another embodiment, the cyclic shift is applied in time domain on a time domain root sequence, then a DFT precoder transforms the time domain sequence into frequency domain, tone mapping is then performed on the cyclically shifted sequence and then an IDFT is performed on the mapped tones.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

System Examples

Figure 9:
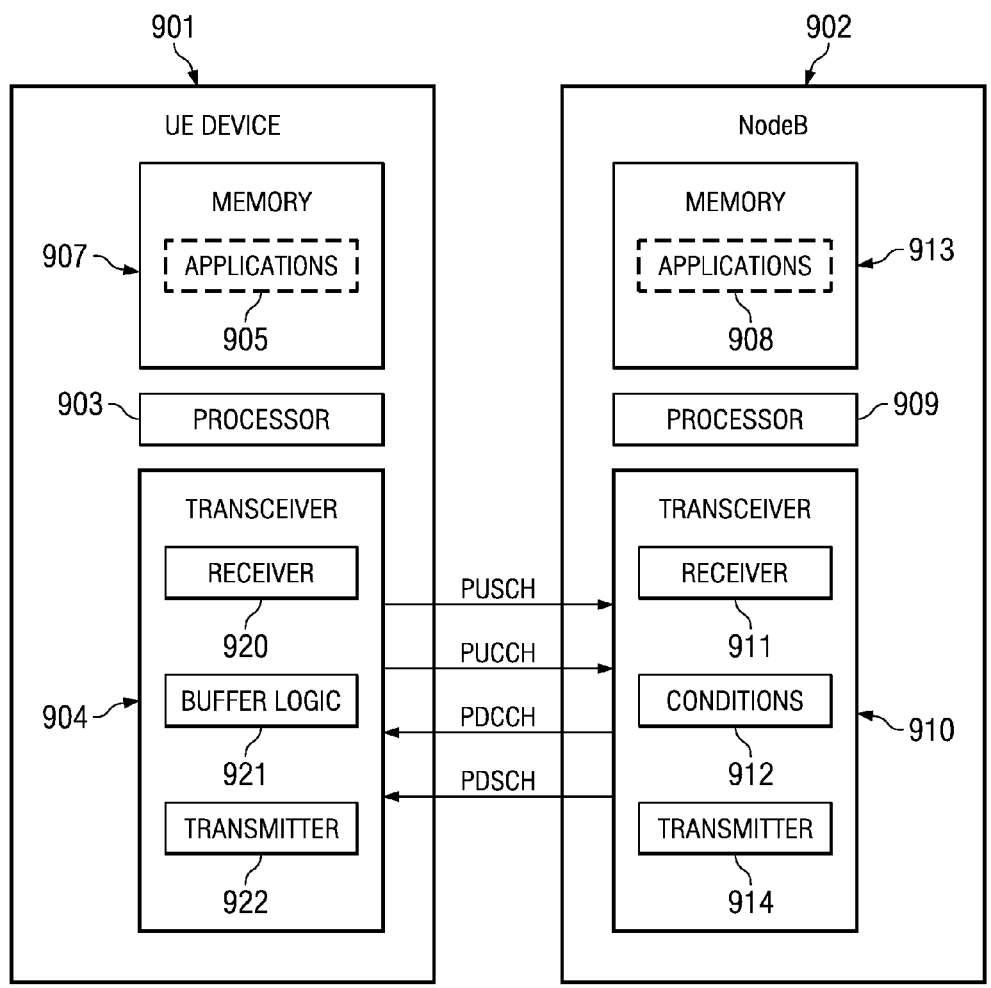
FIG. 9 is an exemplary block diagram of a Node B and a User Equipment for use in the network system of FIG. 1.

FIG. 9 is a block diagram illustrating an exemplary portion of the network system of FIG. 1. A mobile UE device 901 is in communication with an eNB 902 in a cell served by eNB 902. Mobile UE device 901 may represent any of a variety of devices such as a server, a desktop computer, a laptop computer, a cellular phone, a Personal Digital Assistant (PDA), a smart phone or other electronic devices. In some embodiments, UE device 901 communicates with the eNB 902 based on a LTE or E-UTRA protocol. Alternatively, another communication protocol now known or later developed may be used.

As shown, UE device 901 comprises a processor 903 coupled to a memory 907 and a Transceiver 904. The memory 907 stores (software) applications 905 for execution by the processor 903. The applications 905 could comprise any known or future application useful for individuals or organizations. As an example, such applications 905 could be categorized as operating systems (OS), device drivers, databases, multimedia tools, presentation tools, Internet browsers, e-mailers, Voice-Over-Internet Protocol (VoIP) tools, file browsers, firewalls, instant messaging, finance tools, games, word processors or other categories. Regardless of the exact nature of the applications 905, at least some of the applications 905 may direct UE 901 to periodically or continuously transmit uplink signals via PUCCH and PUSCH to eNB (base-station) 902 via transceiver 904.

Transceiver 904 includes uplink logic which may be implemented by execution of instructions that control the operation of the transceiver. Some of these instructions may be stored in memory 907 and executed when needed. As would be understood by one of skill in the art, the components of the Uplink Logic may involve the physical (PHY) layer and/or the Media Access Control (MAC) layer of the transceiver 904. Transceiver 904 includes one or more receivers 920 and one or more transmitters 922.

The transmitter(s) may be embodied as described with respect to FIG. 8 for transmission of SC-OFDM SRI subframes. In particular, as described above, a the specific SRI subframe offset and the index value received from eNB 902 enable UE 901 to determine a unique combination of cyclic shift, RS orthogonal cover, data orthogonal cover, and resource block number to use as a unique physical resource for an SRI in the physical uplink control channel (PUCCH). This determination may be made by software executed on process 903 using mapping tables or equations stored in memory 907. Buffer logic 921 coupled to transmitter 922 stores any pending scheduling request. Receiver 920 is operable to receive and store in memory 907 an allocation comprising a plurality of periodic transmission instances for a scheduling request indicator (SRI) and a logical index value that is used by the UE to map to a unique physical resource for SRI transmissions, using the methods described above. Buffer logic 921 is controlled by processor 903 and is operable to store a pending scheduling request. Transmitter 922 is responsive to the buffer logic and is operable to produce and transmit an SRI in a transmission instance allocated for SRI when the buffer logic indicates the pending scheduling request.

eNB 902 comprises a Processor 909 coupled to a memory 913 and a transceiver 910. Memory 913 stores applications 908 for execution by the processor 909. The applications 908 could comprise any known or future application useful for managing wireless communications. At least some of the applications 908 may direct the base-station to manage transmissions to or from user device 901.

Transceiver 910 comprises an uplink resource manager which enables eNB 902 to selectively allocate uplink PUSCH resources to the user device 901. As would be understood by one of skill in the art, the components of the uplink resource manager 912 may involve the physical (PHY) layer and/or the Media Access Control (MAC) layer of the transceiver 910. Transceiver 910 includes a Receiver 911 for receiving transmissions from various UE within range of the eNB and transmitter 914 for transmission to the various UE within range. The uplink resource manager executes instructions that control the operation of transceiver 910. Some of these instructions may be located in memory 913 and executed when needed. The resource manager controls the transmission resources allocated to each UE that is being served by eNB 902 and broadcasts control information via the physical downlink control channel PDCCH and the physical downlink shared channel PDSCH.

A typical eNB will have multiple sets of receivers and transmitters which operate generally as described herein to support hundreds or thousand of UE within a given cell. Each transmitter may be embodied generally by a processor 909 that executes instructions from memory 913 to perform the scrambling, mapping, and OFDM signal formation, using signal processing techniques as are generally known in the art.

In particular, eNB is operable to transmit an SRI cycle period for use by user equipment (UE), including UE 901, within a cell served by eNB 902. It transmits a specific SRI subframe offset to UE 901 when it detects the presence of UE 901 and transmits an index value to UE 901 for use in determining a unique physical resource for SRI transmission. The index value corresponds to a one-to-one mapping scheme as described above.

Figure 10:
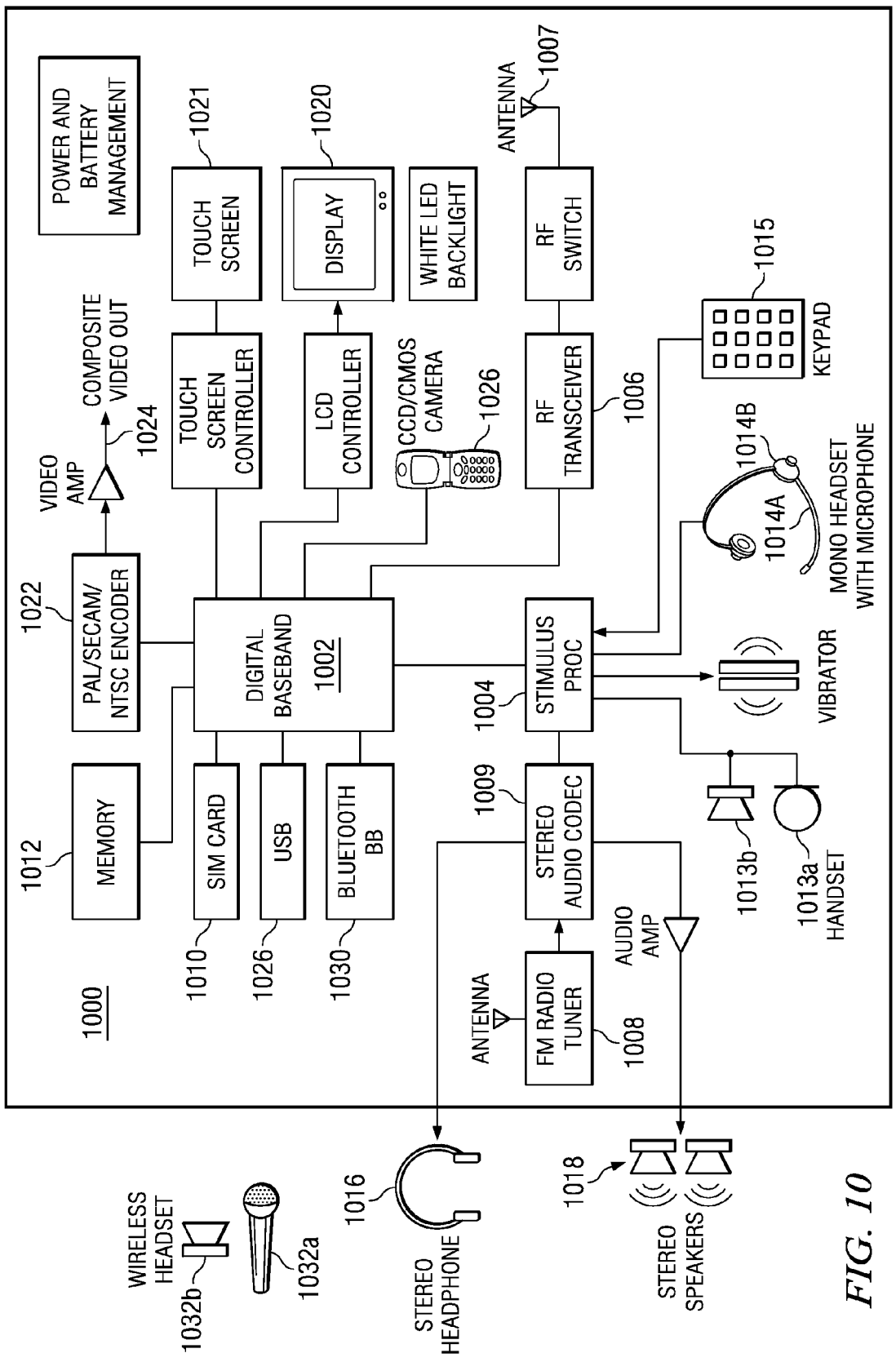
FIG. 10 is a block diagram of a cellular phone for use in the network of FIG. 1.

FIG. 10 is a block diagram of mobile cellular phone 1000 for use in the network of FIG. 1. Digital baseband (DBB) unit 1002 can include a digital processing processor system (DSP) that includes embedded memory and security features. Stimulus Processing (SP) unit 1004 receives a voice data stream from handset microphone 1013a and sends a voice data stream to handset mono speaker 1013b. SP unit 1004 also receives a voice data stream from microphone 1014a and sends a voice data stream to mono headset 1014b. Usually, SP and DBB are separate ICs. In most embodiments, SP does not embed a programmable processor core, but performs processing based on configuration of audio paths, filters, gains, etc being setup by software running on the DBB. In an alternate embodiment, SP processing is performed on the same processor that performs DBB processing. In another embodiment, a separate DSP or other type of processor performs SP processing.

RF transceiver 1006 includes a receiver for receiving a stream of coded data frames and commands from a cellular base station via antenna 1007 and a transmitter for transmitting a stream of coded data frames to the cellular base station via antenna 1007. Transmission of the PUSCH data is performed by the transceiver using the PUSCH resources designated by the serving eNB. In some embodiments, frequency hopping may be implied by using two or more bands as commanded by the serving eNB. In this embodiment, a single transceiver can support multi-standard operation (such as EUTRA and other standards) but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by the mobile UE unite 1000.

The EUTRA defines SC-FDMA (via DFT-spread OFDMA) as the uplink modulation. The basic SC-FDMA DSP radio can include discrete Fourier transform (DFT), resource (i.e. tone) mapping, and IFFT (fast implementation of IDFT) to form a data stream for transmission. To receive the data stream from the received signal, the SC-FDMA radio can include DFT, resource de-mapping and IFFT. The operations of DFT, IFFT and resource mapping/de-mapping may be performed by instructions stored in memory 1012 and executed by DBB 1002 in response to signals received by transceiver 1006.

For SRI transmission, a transmitter(s) may be embodied as described with respect to FIG. 8 by executing signal processing code in DBB 1002. In particular, as described above, a receiver within transceiver 1006 receives an SRI cycle period for use by user equipment (UE) within a cell, a specific SRI subframe offset, and an index value upon entering a cell. An application program executed by DBB 1002 then uses the specific SRI subframe offset and the index value to determine a unique combination of cyclic shift, RS orthogonal cover, data orthogonal cover, and resource block number to use as a unique physical resource for an SRI in the physical uplink control channel (PUCCH). Parameters identifying this unique physical resource may then be stored in DBB 1002 for use by the transmitter.

DBB unit 1002 may send or receive data to various devices connected to universal serial bus (USB) port 1026. DBB 1002 can be connected to subscriber identity module (SIM) card 1010 and stores and retrieves information used for making calls via the cellular system. DBB 1002 can also connected to memory 1012 that augments the onboard memory and is used for various processing needs. DBB 1002 can be connected to Bluetooth baseband unit 1030 for wireless connection to a microphone 1032a and headset 1032b for sending and receiving voice data. DBB 1002 can also be connected to display 1020 and can send information to it for interaction with a user of the mobile UE 1000 during a call process. Display 1020 may also display pictures received from the network, from a local camera 1026, or from other sources such as USB 1026. DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder unit 1022 can provide encoding according to PAL/SECAM/NTSC video standards.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

In some embodiments, a transmission instance may refer to a subframe that contains two slots as describe herein. In another embodiment, a transmission instance may refer to a single slot. In yet other embodiments, a transmission instance may refer to another agreed upon logical time duration that may be allocated for transmission resources.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A base station for use in a wireless network, comprising:
a processor operable to execute instructions, coupled to a memory containing instructions for the processor;
a radio receiver and a transmitter coupled to the processor;
wherein the transmitter is operable to:
transmit an SRI cycle period for use by user equipment (UE) within a cell;
transmit a specific SRI subframe offset to a first UE;
transmit an index value n to the first UE; and
wherein the specific SRI subframe offset and the index value n enable the first UE to determine a unique combination of cyclic shift, reference signal (RS) orthogonal cover, data orthogonal cover, and resource block number for the first UE to use as a unique physical resource for an SRI in the physical uplink control channel (PUCCH);
wherein the SRI is transmitted on a two-state SR channel.

2. The base station of claim 1 wherein the SRI cycle period extends the unique physical resource to a persistent periodic physical resource.

3. The base station of claim 1 wherein the SRI cycle period, the specific SRI subframe offset and the index value n are transmitted in UE-specific level three (L3) signaling in media access control (MAC) protocol data unit (PDU) on a physical downlink shared channel (PDSCH).

4. The base station of claim 1, wherein the specific SRI subframe offset and the index value n enable the first UE to determine a unique combination, wherein an SRI resource indexed by n is located in a physical uplink control channel (PUCCH) resource block (RB) number wherein the PUCCH RB number is $$\left\lfloor \frac{n \bmod N_{SRI}^{SFRB} N_{SRI}}{N_{SRI}^{SFRB}} \right\rfloor$$

a subframe $$S0 + \left\lfloor \frac{n \bmod N_{SRI}^{SFRB} N_{SRI}}{N_{SRI}^{SFRB}} \right\rfloor$$

indicating where an SRI resource is located on a channelization resource indexed by $n_{SRI}$ (SRI resource index)=(n mod $N_{SRI}^{SFRB}$);
wherein the acronym SFRB means subframe source block;
wherein $N_{SRI}^{SFRB}$ is the SRI multiplexing capacity in one subframe of an RB; and
wherein $N_{SRI}$ is the SRI period expressed in number subframes, and S0 is the number of a first subframe of an SRI period, and assuming a PUCCH RB indexing starts from an upper edge of the PUCCH down to a lower edge.

5. The base station of claim 4, wherein $N_{SRI}^{SFRB}$ is the SRI multiplexing capacity in one subframe of a RB, given a cyclic shift separation $\Delta_{shift}^{PUCCH}$ between resources using the same orthogonal covering code, $$N_{SRI}^{SFRB} = \begin{cases} 6N_{SC}^{RB}/\Delta_{shift}^{PUCCH} & \text{for normal cyclic prefix} \\ 4N_{SC}^{RB}/\Delta_{shift}^{PUCCH} & \text{for extended cyclic prefix} \end{cases},$$

wherein $N_{SC}^{RB}$ is the number N of sub-carriers (SC) in one resource block (RB).

6. The base station of claim 4, wherein resources used for SRI transmission on PUCCH in a given RB/subframe are identified by the resource index $n_{SRI}$ from which the orthogonal sequence indexes $n_{OC,1}^{(n_s)}$, $n_{OC,2}^{(n_s)}$, $n_{OC,3}^{(n_s)}$ of block spreading codes 1, 2 and 3 respectively, and a cyclic shift $\alpha(l)$ are determined according to:

$$n_{OC,1}^{(n_s)} = (n_{OC,1}^{(0)} + f_1(n_s)) \bmod 3$$

$$n_{OC,2}^{(n_s)} = (n_{OC,2}^{(0)} + f_2(n_s)) \bmod 3$$

$$n_{OC,3}^{(n_s)} = (n_{OC,3}^{(0)} + f_3(n_s)) \bmod 3$$

$$\alpha(l) = (\alpha^{(0)} + f_4(l)) \bmod N_{SC}^{RB}$$

where $N_{SC}^{RB}=12$ is the number of sub-carriers in one resource block (RB) and $$n_{OC,1}^{(0)} = \begin{cases} \lfloor (n_{SRI} \bmod (N_{SRI}^{SFRB}/2))\Delta_{shift}^{PUCCH}/N_{SC}^{RB} \rfloor & \text{for normal cyclic prefix} \\ 2\lfloor (n_{SRI} \bmod (N_{SRI}^{SFRB}/2))\Delta_{shift}^{PUCCH}/N_{SC}^{RB} \rfloor & \text{for extended cyclic prefix} \end{cases}$$

$$n_{OC,2}^{(0)} = \lfloor (n_{SRI} \bmod (N_{SRI}^{SFRB}/2))\Delta_{shift}^{PUCCH}/N_{SC}^{RB} \rfloor$$

$$n_{OC,3}^{(0)} = \lfloor 2n_{SRI}/N_{SRI}^{SFRB} \rfloor$$

$$\alpha^{(0)} = \begin{cases} \left( \begin{array}{c} (n_{SRI} \bmod (N_{SRI}^{SFRB}/2))\Delta_{shift}^{PUCCH} + \\ \delta_{offset}^{PUCCH} + (n_{OC,1}^{(0)} \bmod \Delta_{shift}^{PUCCH}) \end{array} \right) \bmod N_{SC}^{RB} & \text{normal } cp \\ \left( \begin{array}{c} (n_{SRI} \bmod (N_{SRI}^{SFRB}/2))\Delta_{shift}^{PUCCH} + \\ \delta_{offset}^{PUCCH} + n_{OC,2}^{(0)} \end{array} \right) \bmod N_{SC}^{RB} & \text{extended } cp \end{cases}$$

and $f_1(n_s)$, $f_2(n_s)$, $f_3(n_s)$ represent index hopping functions varying per slot and $f_4(l)$ represents index hopping function varying per symbol.

7. The base station of claim 1, further comprising receiving an SRI from the first UE on the unique physical resource in accordance with the specific SRI subframe offset and the index value n.

8. A base station for use in a wireless network, comprising:
a processor operable to execute instructions, coupled to a memory containing instructions for the processor;
a radio receiver and a transmitter coupled to the processor;
wherein the receiver is operable to:
receive an SRI cycle period for use by user equipment (UE) within a cell;
receive a specific SRI subframe offset at a first UE;
receive an index value n at the first UE; and
determining a unique combination of cyclic shift, reference signal (RS) orthogonal cover, data orthogonal cover, and resource block number for the first UE to use as a unique physical resource for an SRI in the physical uplink control channel (PUCCH) according to the specific SRI subframe offset and the index value n;
wherein the SRI is transmitted on a two-state SR channel.

9. The base station of claim 8 wherein the SRI cycle period extends the unique physical resource to a persistent periodic physical resource.

10. The base station of claim 8 wherein the SRI cycle period, the specific SRI subframe offset and the index value n are received in level three (L3) signaling in media access control (MAC) protocol data unit (PDU) on a physical downlink shared channel (PDSCH).

11. The base station of claim 8, wherein the specific SRI subframe offset and the index value n enable the first UE to determine a unique combination, wherein an SRI resource indexed by n is located in a physical uplink control channel (PUCCH) resource block (RB) number wherein the PUCCH RB number is $$\lfloor n/N_{SRI}^{SFRB} N_{SRI} \rfloor;$$

a subframe $S0 + \lfloor (n \bmod N_{SRI}^{SFRB} N_{SRI})/N_{SRI}^{SFRB} \rfloor$ indicating where an SRI resource is located on a channelization resource indexed by $n_{SRI}$ (SRI resource index)=(n mod $N_{SRI}^{SFRB}$);
wherein the acronym SFRB means subframe source block;
wherein $N_{SRI}^{SFRB}$ is the SRI multiplexing capacity in one subframe of a RB; and
wherein $N_{SRI}$ is the SRI period expressed in number subframes, and S0 is the number of a first subframe of an SRI period, and assuming a PUCCH RB indexing starts from an upper edge of the PUCCH down to a lower edge.

12. The base station of claim 11, wherein $N_{SRI}^{SFRB}$ is the SRI multiplexing capacity in one subframe of a RB, given a cyclic shift separation $\Delta_{shift}^{PUCCH}$ shift between resources using the same orthogonal covering code, $$N_{SRI}^{SFRB} = \begin{cases} 6N_{SC}^{RB}/\Delta_{shift}^{PUCCH} & \text{for normal cyclic prefix} \\ 4N_{SC}^{RB}/\Delta_{shift}^{PUCCH} & \text{for extended cyclic prefix} \end{cases},$$

wherein $N_{SC}^{RB}$ is the number N of sub-carriers (SC) in one resource block (RB).

13. The base station of claim 11, wherein resources used for SRI transmission on PUCCH in a given RB/subframe are identified by the resource index $n_{SRI}$ from which the orthogonal sequence indexes $n_{OC,1}^{(n_s)}, n_{OC,2}^{(n_s)}, n_{OC,3}^{(n_s)}$ of the block spreading codes 1, 2 and 3 respectively, and a cyclic shift $\alpha(l)$ are determined according to:

$$n_{OC,1}^{(n_s)} = (n_{OC,1}^{(0)} + f_1(n_s)) \bmod 3$$

$$n_{OC,2}^{(n_s)} = (n_{OC,2}^{(0)} + f_2(n_s)) \bmod 3$$

$$n_{OC,3}^{(n_s)} = (n_{OC,3}^{(0)} + f_3(n_s)) \bmod 3$$

$$\alpha(l) = (\alpha^{(0)} \pm f_4(l)) \bmod N_{SC}^{RB}$$

where $N_{SC}^{RB} = 12$ is the number of sub-carriers in one resource block (RB) and $$n_{OC,1}^{(0)} = \begin{cases} \lfloor (n_{SRI} \bmod (N_{SRI}^{SFRB}/2))\Delta_{shift}^{PUCCH}/N_{SC}^{RB} \rfloor & \text{for normal cyclic prefix} \\ 2\lfloor (n_{SRI} \bmod (N_{SRI}^{SFRB}/2))\Delta_{shift}^{PUCCH}/N_{SC}^{RB} \rfloor & \text{for extended cyclic prefix} \end{cases}$$

$$n_{OC,2}^{(0)} = \lfloor (n_{SRI} \bmod (N_{SRI}^{SFRB}/2))\Delta_{shift}^{PUCCH}/N_{SC}^{RB} \rfloor$$

$$n_{OC,3}^{(0)} = \lfloor 2n_{SRI}/N_{SRI}^{SFRB} \rfloor$$

$$\alpha^{(0)} = \begin{cases} \left( \begin{array}{l} (n_{SRI} \bmod (N_{SRI}^{SFRB}/2))\Delta_{shift}^{PUCCH} + \\ \delta_{offset}^{PUCCH} + (n_{OC,1}^{(0)} \bmod \Delta_{shift}^{PUCCH}) \end{array} \right) \bmod N_{SC}^{RB} & \text{normal } cp \\ \left( \begin{array}{l} (n_{SRI} \bmod (N_{SRI}^{SFRB}/2))\Delta_{shift}^{PUCCH} + \\ \delta_{offset}^{PUCCH} + n_{OC,2}^{(0)} \end{array} \right) \bmod N_{SC}^{RB} & \text{extended } cp \end{cases}$$

and $f_1(n_s), f_2(n_s), f_3(n_s)$ represent index hopping functions varying per slot and $f_4(l)$ represents index hopping function varying per symbol.

14. The base station of claim 8, further comprising transmitting an SRI from the first UE on the unique physical resource in accordance with the specific SRI subframe offset and the index value n.

* * * * *

UNITED STATES PATENT AND TRADEMARK OFFICE
CERTIFICATE OF CORRECTION

PATENT NO. : 8,379,507 B2  
APPLICATION NO. : 13/245994  
DATED : February 19, 2013  
INVENTOR(S) : Pierre Bertrand et al.

Page 1 of 1

It is certified that error appears in the above-identified patent and that said Letters Patent is hereby corrected as shown below:

On the title page, item 63 should read

Related U.S. Application Data

Continuation of application No. 12/344,156 filed on Dec. 24, 2008, now Pat. No. 8,059,524, Provisional application No. 61/019,013, filed on Jan. 4, 2008, provisional application No. 61/023,225 filed on Jan. 24, 2008, provisional application No. 61/024,006, filed on Jan. 28, 2008, provisional application No. 61/032,519 filed on Feb. 29, 2008.

Signed and Sealed this  
Twentieth Day of August, 2013

Teresa Stanek Rea  
*Acting Director of the United States Patent and Trademark Office*